United States Patent
Goel et al.

(10) Patent No.: US 9,916,684 B2
(45) Date of Patent: Mar. 13, 2018

(54) GENERATING PORTABLE THREE-DIMENSIONAL PRINT-PREVIEW RENDERINGS OF THREE-DIMENSIONAL MODELS

(71) Applicant: Adobe Systems Incorporated, San Jose, CA (US)

(72) Inventors: Naveen Goel, Noida (IN); Michael Scrutton, Fremont, CA (US); Mayur Hemani, New Delhi (IN); Harsh Vardhan Chopra, New Delhi (IN); Amit Mittal, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/221,052

(22) Filed: Jul. 27, 2016

(65) Prior Publication Data

US 2018/0033193 A1    Feb. 1, 2018

(51) Int. Cl.
*G06T 17/00* (2006.01)
*G06T 15/04* (2011.01)
*G06F 3/12* (2006.01)

(52) U.S. Cl.
CPC ............ *G06T 17/00* (2013.01); *G06F 3/1211* (2013.01); *G06F 3/1256* (2013.01); *G06T 15/04* (2013.01)

(58) Field of Classification Search
None
See application file for complete search history.

(56) References Cited

U.S. PATENT DOCUMENTS

| | | | |
|---|---|---|---|
| 2008/0036755 A1* | 2/2008 | Bae | G06F 17/50 345/418 |
| 2015/0142152 A1* | 5/2015 | Rezayat | B29C 67/0088 700/98 |
| 2015/0151492 A1* | 6/2015 | Schmidt | B29C 67/0092 700/98 |
| 2017/0085733 A1* | 3/2017 | Ilic | G06T 19/20 |

OTHER PUBLICATIONS

Stava, Ondrej, et al. "Stress relief: improving structural strength of 3D printable objects." ACM Transactions on Graphics (TOG) 31.4 (2012): 48.*
Michael Garland; Paul S. Heckbert; "Surface Simplification Using Quadric Error Metrics;" Carnegie Mellon University; SIGGRAPH '97; Sep. 1997.
Lior Shapira; Ariel Shamir; Daniel Cohen-Or; "Consistent Mesh Partitioning and Skeletonisation Using the Shape Diameter Function;" The Visual Computer; Apr. 2008.

(Continued)

*Primary Examiner* — Vu Nguyen
(74) *Attorney, Agent, or Firm* — Keller Jolley Preece

(57) ABSTRACT

The present disclosure is directed toward systems and methods for providing a preview that includes a visualization of various properties of an object to be printed from a three-dimensional input model. For example, systems and methods described herein involve performing one or more of a printability analysis, appearance analysis, true-visual analysis, accuracy analysis, and an integrity analysis to identify defects, visual characteristics and other properties of the object to be printed. Systems and methods described herein further relate to generating texture maps and applying the texture maps to three-dimensional renderings of the three-dimensional model to provide an interactive preview to enable a user to view and comprehend various issues associated with printing the object from the three-dimensional model.

20 Claims, 9 Drawing Sheets

(56) References Cited

OTHER PUBLICATIONS

Tian-Ming Wang; Jun-Tong Xi; Ye Jin; "A Model Research for Prototype Warp Deformation in the FDM Process;" The International Journal of Advanced Manufacturing Technology; Aug. 2007.
R. Anitha; S. Arunachalam; P. Radhakrishnan; "Critical Parameters Influencing the Quality of Prototypes in Fused Deposition Modelling;" Journal of Materials Processing Technology; Dec. 2001.
A. Boschetto; L. Bottini; "Accuracy Prediction in Fused Deposition Modeling;" The International Journal of Advanced Manufacturing Technology; Jul. 2014.
Pulak M. Pandey; N. Venkata Reddy; Sanjay G. Dhande; "Improvement of Surface Finish by Staircase Machining in Fused Deposition Modeling;" Journal of Materials Processing Technology; Jan. 2003.
Nur Saaidah Abu Bakar; Mohd Rizal Alkahari; Hambali Boejang; "Analysis on Fused Deposition Modelling Performance;" Journal of Zhejiang University—Science A; Dec. 2010.
Behnam Nourghassemi; "Surface Roughness Estimation for FDM Systems;" A Thesis Presented to the Mechanical Engineering Department, Ryerson University, Jan. 2011.
Zhiqiang Xu; Guoliang Xu; "Discrete Schemes for Gaussian Curvature and Their Convergence;" Sep. 5, 2006; Institute of Computational Math. and Sci. and Eng. Computing, Academy of Mathematics and System Sciences, Chinese Academy of Sciences.
A. Iones; A. Krupkin; M. Sbert; S. Zhukov; "Fast Realistic Lighting for Video Games;" Saber Interactive, University of Girona Spain and Creat Studio; May 2003.

\* cited by examiner

GENERATING PORTABLE THREE-DIMENSIONAL PRINT-PREVIEW RENDERINGS OF THREE-DIMENSIONAL MODELS

BACKGROUND

Recent years have seen a rapid proliferation in drafting, modeling, and printing three-dimensional objects. Indeed, it is now common for individuals and businesses to draft a three-dimensional model of an object utilizing a computing device and then create a physical copy of the object utilizing a three-dimensional printer. For example, utilizing conventional three-dimensional printing systems, businesses can now design and print objects ranging from nanostructures to large buildings, including such objects as minute machining parts, medical implants, art, homes, or even bridges.

Although conventional three-dimensional printing systems allow users to design and print a wide array of objects, such systems have a variety of problems. For example, in many instances, digital modeling systems generate three-dimensional models that contain errors, artifacts, or various defects and, therefore, cannot be printed. Indeed, digital three-dimensional models often have issues that undermine the integrity, appearance, and/or accuracy of a printed physical object. For instance, in some cases, a digital three-dimensional model has holes or gaps at vertices or corresponding edges of an underlying structure that make the model unsuitable for printing. Similarly, many three-dimensional printing systems utilize triangular modeling elements and models frequently contain flipped, duplicate, or overlapping triangular modeling elements. In addition, three-dimensional modeling systems may have elements with incorrect (e.g., inverted) normal vectors that can affect or prohibit three-dimensional printing. Furthermore, three-dimensional models may have regions of low strength that result in compromised structural integrity of a corresponding printed object.

Users often experience frustration when a three-dimensionally printed object fails to reflect a digital preview of the digital three-dimensional model. For example, conventional three-dimensional printing systems often provide a digital preview illustrating how a three-dimensionally printed object will appear. Conventional systems, however, often fail to provide a preview that accurately reflects various issues associated with the printability, appearance, accuracy, and/or integrity of the digital three-dimensional model. Thus, users are often disappointed when three-dimensional objects are printed and fail to accurately reflect the three-dimensional model.

In addition, conventional three-dimensional printing systems often produce bulky data files that provide limited viewing capabilities that are unavailable to many users. For example, many digital previews of three-dimensional models are only viewable using specialized software, thus preventing various users without access to the specialized software from viewing a digital preview for a three-dimensional model. Additionally, due to the amount of data contained within the three-dimensional model, producing and viewing digital previews of three-dimensional models is often computationally prohibitive. As a result, many users experience frustration using personal computers and/or mobile devices having limited processing capabilities that are unable to view and/or facilitate user interaction with a digital preview of a three-dimensional model.

These and other problems exist with regard to generating and providing previews of three-dimensional models.

SUMMARY

Embodiments of the present disclosure provide benefits and/or solve one or more of the foregoing and other problems in the art with systems and methods that generate digital previews of a three-dimensional model. In particular, in one or more embodiments, the disclosed systems and methods generate and provide a preview that includes a visualization of various properties of an object to be printed from the three-dimensional model. For example, the disclosed systems and methods perform one or more of a printability analysis, an appearance analysis, an accuracy analysis, or an integrity analysis to identify defects, visual characteristics, and other properties of a projected object to be printed from the three-dimensional model. In particular, systems and methods described herein identify anomalies, errors, artifacts, imperfections, and/or other issues of the three-dimensional model. The disclosed systems and methods can further apply one or more of the analyses to the three-dimensional model to generate a three-dimensional preview that provides a visualization of one or more of the identified properties of a printable object.

Additionally, in one or more embodiments, the systems and methods generate a lightweight and portable rendering of the digital preview of the three-dimensional model that facilitates convenient viewing and sharing between various users. For example, in one or more embodiments, systems and methods described herein analyze the three-dimensional model and generate one or more texture maps that indicate various identified properties of the three-dimensional model. The systems and methods can further generate a portable three-dimensional rendering of the various analyses by applying the one or more texture maps to an underlying structure of the three-dimensional model and provide a three-dimensional rendering of an the analysis within a portable document format (PDF) document.

Additional features and advantages will be set forth in the description which follows, and in part will be obvious from the description, or may be learned by the practice of such exemplary embodiments. The marketing features and advantages of such embodiments may be realized and obtained by means of the instruments and combinations particularly pointed out in the appended claims. These and other marketing features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and marketing features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1:
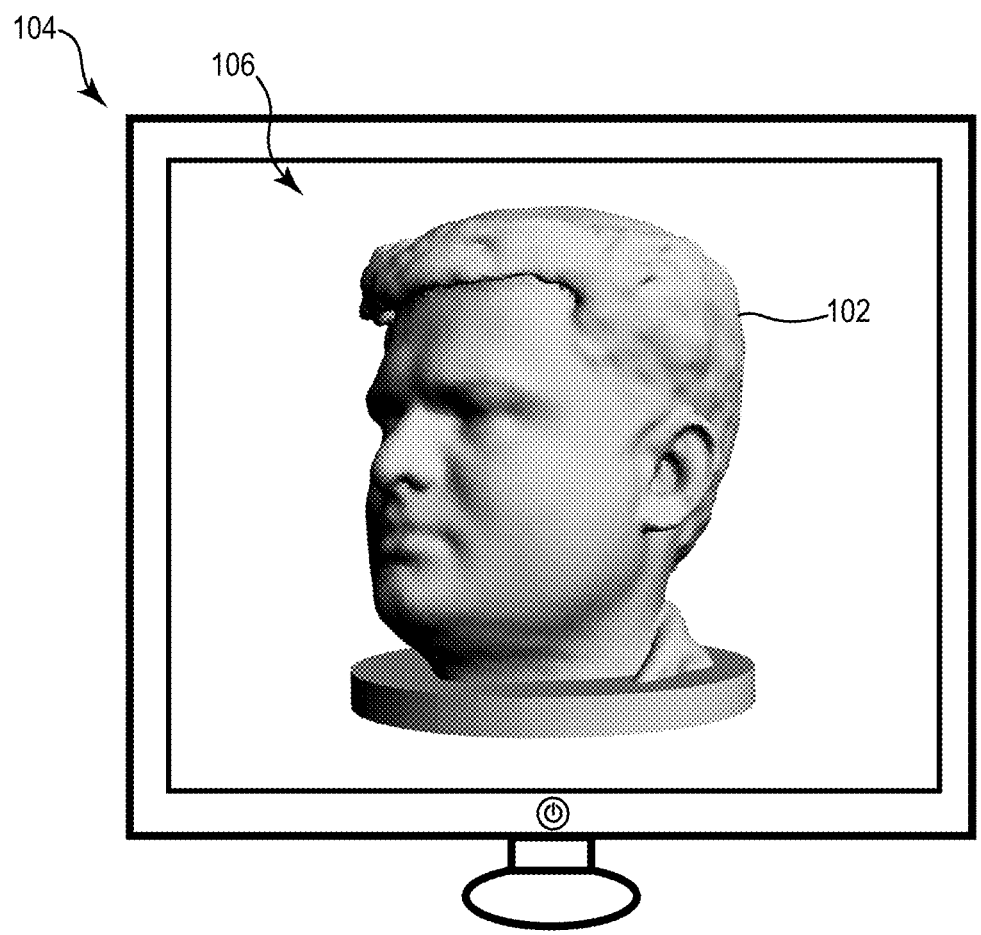
FIG. 1 illustrates a three-dimensional model in accordance with one or more embodiments.

One or more embodiments of the present disclosure include a three-dimensional preview generating system and corresponding methods that generate digital print previews of three-dimensional models. In particular, in one or more embodiments, the three-dimensional preview generating system analyzes an input model (e.g., three-dimensional input model) to identify properties and/or possible defects of a three-dimensional object to be printed based on the input model (e.g., a printable object). In addition, the three-dimensional preview generating system applies the analysis to an underlying structure of the input model to generate a three-dimensional preview of the input model. In particular, the three-dimensional preview generating system provides a portable three-dimensional rendering that includes a visualization of any number of the identified properties and/or defects. In this way, a user can view and interact with the three-dimensional rendering of the analysis to observe and comprehend various issues associated with printing the object illustrated by the input model.

As mentioned above, in one or more embodiments, the three-dimensional preview generating system analyzes the input model to determine various properties of a printable object based on the input model. For example, upon receiving a three-dimensional input model for an object, the three-dimensional preview generating system performs one or more types of analyses to identify various defects associated with printing the object. In particular, the three-dimensional preview generating system can perform one or multiple types of calculations on the input model to identify properties and/or defects associated with printability, integrity, accuracy, and appearance of the resulting printed object. Additionally, the three-dimensional preview generating system enables a user to view a true-visual three-dimensional rendering of the printable object based on the input model.

As an example, the three-dimensional preview generating system can perform a printability analysis on the input model to identify a number of printability defects that render the input model unprintable. For instance, in one or more embodiments, the three-dimensional preview generating system analyzes an underlying structure (e.g., mesh) of the input model to identify properties of the underlying structure that would prevent a three-dimensional printer from printing an object based on the input model. As will be described in greater detail below, the three-dimensional preview generating system analyzes the input model to identify various printability defects including, for example, self-intersecting faces; isolated vertices, edges, and faces; degenerate faces; mesh holes; t-vertices; non-manifold edges; folded faces; and other printability defects that render the input model unprintable.

Additionally, or alternatively, the three-dimensional preview generating system can perform an integrity analysis to identify one or more structural properties of a printable object based on the input model. In particular, the three-dimensional preview generating system can identify portions of a printable object that may result in an object that is structurally flawed or unstable. For instance, in one or more embodiments, the three-dimensional preview generating system analyzes the input model to identify and classify portions of a printable object that range anywhere between structurally strong to structurally weak. As will be described in further detail below, the three-dimensional preview generating system analyzes the input model to identify one or more structural properties including, for example, supports, infill types, or other structural properties as well as resulting structural defects or vulnerabilities that could cause a printed object to break during or after the printing process.

Further, the three-dimensional preview generating system can perform an accuracy analysis to identify a number of accuracy defects including discrepancies or inaccuracies between the input model and a resulting printed object based on the input model. For instance, the three-dimensional preview generating system analyzes the input model to identify whether a printable object or portions of a printable object will accurately reflect the structure and appearance of the input model. To illustrate, in one or more embodiments, the three-dimensional preview generating system analyzes the input model to identify overhanging features, slope inaccuracies, and other possible characteristics of the input model that may result in discrepancies between the input model and a printed object as a result of limitations of the three-dimensional printing process.

In addition, the three-dimensional preview generating system can perform an appearance analysis to identify any number of visual properties of a printable object. For instance, the three-dimensional preview generating system identifies and analyzes various factors including, for example, the color of material used to print an object, viewing conditions, and reflection behavior of a surface of the object. Based on this analysis, the three-dimensional preview generating system can generate a three-dimensional rendering of the input model that includes a visualization of different visual characteristics of a printed object that may not be accurately reflected by the input model.

Moreover, in one or more embodiments, the three-dimensional preview generating system performs a true-visual analysis of the input model in view of limitations of a printer and/or material used to print an object. For example, in some instances, the three-dimensional preview generating system modifies an input model to generate a reduced-resolution version of the input model that more closely reflects a true-visual appearance of an object to be printed by a particular printer. In particular, the three-dimensional preview generating system can consider resolution capabilities of a printer as well as vertices, edges, and faces of a mesh structure to generate a modified mesh structure and true-visual texture map applied to the mesh structure that more closely reflects the physical appearance of the printable object (e.g., in view of the resolution capabilities of a three-dimensional printer).

In addition to analyzing an input model to identify any number of properties of the printable object, the three-dimensional preview generating system can additionally utilize the different analyses of the input model to generate one or more three-dimensional printability previews of the input model that visualizes any number of the identified properties of the printable object. For example, as will be described in more detail below, the three-dimensional preview generating system can apply the analysis of the input model to an underlying structure (e.g., mesh) of the input model (or modified version of input model) to generate a three-dimensional rendering of the analysis. In one or more embodiments, the three-dimensional preview generating system applies each of multiple types of analyses (e.g., appearance analysis and accuracy analysis) to the input model to generate three-dimensional renderings of the input model that illustrate different types of properties of the printable object.

For example, in one or more embodiments, the three-dimensional preview generating system generates one or more texture maps that include indicators of properties identified by the different analyses of the input model. In particular, the three-dimensional preview generating system generates a texture map (or multiple texture maps) that includes a mapping of one or multiple properties of a printable object based on the input model. In one or more embodiments, the three-dimensional preview generating system generates a texture map for each type of analysis that illustrates a respective property of the printable object. As an example, the three-dimensional preview generating system generates a printability texture map that illustrates various printability defects. Additionally, the three-dimensional preview generating system can generate an integrity texture that illustrates potential structural defects of the printable object. Further, the three-dimensional preview generating system can generate an accuracy texture map that indicates discrepancies between the input model and a printable object based on the input model. The three-dimensional preview generating system can further generate an appearance texture that illustrates one or more surface characteristics of the printable object.

Upon generating a texture map, the three-dimensional preview generating system can apply the texture map to an underlying structure of the input model to generate a portable three-dimensional preview of an object to be printed that illustrates various properties identified by a respective analysis of the input model. For example, in one or more embodiments, the three-dimensional preview generating system applies a texture map to a three-dimensional mesh (e.g., underlying mesh structure) of the input model to generate a three-dimensional rendering of the printable object that illustrates one or more issues indicated by the texture map. It is appreciated that the three-dimensional preview generating system can apply any number of texture maps to the mesh structure of the input model to generate different renderings of the printable object that highlight different determined properties of the printable object. Thus, the three-dimensional preview generating system can generate multiple three-dimensional renderings corresponding to respective types of analyses of the input model.

Upon generating one or multiple three-dimensional previews of the printable object from the input model, the three-dimensional preview generating system can embed any number of previews including three-dimensional renderings of the printable object in a portable document format (PDF) document. For example, in some instances, the three-dimensional preview generating system generates a PDF document that includes previews that include three-dimensional renderings of each of the texture maps that are viewable to a user. In one or more embodiments, the PDF document provides an interface whereby a user can interact with and view respective previews of the printable object thus enabling the user to view, query, and comprehend various issues of the input model based on the different types of analyses performed on the input model.

Thus, one or more embodiments enable a user to conveniently view and comprehend identified properties of an object to be printed from a three-dimensional input model. As an example, the three-dimensional preview generating system facilitates presentation of a three-dimensional preview that includes a visualization of any number of defects, visual characteristics, and other properties of the printable object. As mentioned above, in one or more embodiments, the three-dimensional preview generating system generates a three-dimensional visualization for each type of analysis, thus enabling the user to individually view different types of properties of the printable object. In this way, a user can conveniently view and easily comprehend different types of issues associated with printing from input model.

Additionally, in one or more embodiments, the three-dimensional preview generating system enables a user to interact with and view different perspectives of an object preview. For example, the three-dimensional preview generating system embeds the three-dimensional previews within a three-dimensional PDF document that provides a three-dimensional rendering of the printable object including a visualization of various properties identifying from analyzing the input model. Additionally, as will be described in more detail below, the three-dimensional preview generating system can provide a preview interface that enables a user to switch between different three-dimensional renderings corresponding to different types of defects, visual characteristics, or physical properties of a printed object, thus enabling a user to easily view and comprehend issues associated with printing the object based on the input model.

Moreover, one or more embodiments facilitate creation of an integrated document that is transferable and conveniently viewable by a wide array of client devices. For example, by embedding one or more three-dimensional previews of a printable object in a PDF document that includes preview information rather than all information associated with the input model or printing an object from the input model, the three-dimensional preview generating system facilitates creation of a lightweight portable document that is viewable by most client devices. As such, a user can view and interact with a preview of the printable object on a client device having limited processing capabilities. Additionally, by embedding the three-dimensional preview(s) within a three-dimensional PDF document (or other common document formats) a user can view and interact with the three-dimensional renderings of the various identified defects or other properties without utilizing expensive and/or specialized software available only to select client devices.

Thus, the three-dimensional preview generating system can reduce processing and memory requirements of computing devices implementing the three-dimensional preview generating system. Indeed, rather than having to manipulate computationally large and complex three-dimensional models, the three-dimensional preview generating system provides computationally small and simple three-dimensional PDF documents significantly reduce amount of computing resources required to manipulate and view a print preview of a 3D model.

Additional detail will now be provided regarding the three-dimensional preview generating system in relation to illustrative figures portraying exemplary embodiments. For example, as will be described in greater detail below, FIG. 1 illustrates an example three-dimensional input model. FIGS. 2A-2E illustrate example representations of three-dimensional previews of different types of analyses of the input model shown in FIG. 1. Thereafter, FIG. 3 illustrates an example preview interface presentable via a graphical user interface that enables a user to interact with a preview of the input model as well as previews of different renderings of the input model to view and comprehend various defects and other issues associated with printing an object based on the three-dimensional input model.

As mentioned above, FIG. 1 illustrates a three-dimensional input model 102 (or simply "input model 102") in accordance with one or more embodiments. In particular, FIG. 1 illustrates a client device 104 displaying the input model 102 via a graphical user interface 106 on a display of the client device 104.

As used herein, the term "three-dimensional model," "three-dimensional input model" or "input model" refers to a digital representation of a three-dimensional object. In particular, the term "three-dimensional model" includes a three-dimensional mesh structure (or simply "mesh"). For example, the term "three-dimensional model" includes a three-dimensional mesh (e.g., polygon mesh) of elements, such vertices, connecting edges, and/or faces defined by intersecting edges and vertices. For instance, a three-dimensional model includes a mesh defined by a plurality of vertices defining triangular modeling elements (e.g., triangular faces) that make up the three-dimensional model. A three-dimensional model can also comprise a rendering with one or more wraps, textures, or surfaces in conjunction with a shell. For example, as illustrated in FIG. 1, the three-dimensional input model 102 comprises a plurality of vertices (e.g., points of a polygon that make up a three-dimensional model) with a surface covering the plurality of vertices to provide an indication of how the three-dimensional model will appear as a printed object. In one or more embodiments, the three-dimensional input model 102 includes a tessellated object in one or more supported formats (e.g., 3D portable document format (PDF), STereo-Lithography (STL) format, OBJ format).

It is appreciated that the computing device 104 can refer to any electronic device (e.g., user device) that includes or is coupled to a display device having a graphical user interface thereon. Examples of client devices can include, but are not limited to, mobile devices (e.g., smartphones, tablets, smart watches), laptops, desktops, or other type of computing device, such as those described in connection with FIG. 7. Additionally, it is appreciated that features and functionality described herein with regard to the three-dimensional preview generating system can be implemented on the client device 104, a server (e.g., web server) in communication with the client device 104, or a combination of multiple computing devices.

As illustrated in FIG. 1, the client device 104 provides a display of a three-dimensional preview of the input model 102 within a graphical user interface 106 on the client device 104. As further shown in FIG. 1, the client device 104 provides a digital rendering in accordance with capabilities of the client device 104 (e.g., display capabilities) without consideration of one or more printing limitations of a three-dimensional printer. For example, the depiction of the input model 102 shown in FIG. 1 illustrates an ideal representation of a printable object based on the input model 102 as created using drafting software and/or as originally designed. In one or more embodiments, the input model 102 represents a digital design of a three-dimensional object independent from any number of issues associating with printing the three-dimensional object depicted by the input model 102.

As mentioned previously, the three-dimensional preview generating system can identify a number of properties of an object to be printed based on the input model 102. As used herein, the term "properties of an object," "object properties," or derivations thereof refer to physical and visual characteristics of an object to be printed based on the input model 102. For example, in one or more embodiments, properties of an objet refer to structural properties including a relative strength of an object or portion of an object during or after performing a printing process. As another example, object properties refer to surface features of an object including, for instance, roughness, color, brightness, reflectiveness, or other features related to a visual appearance of a printed object. Moreover, in one or more embodiments, object properties refer to defects or other issues associated with how a printed object will appear.

Thus, as mentioned previously, the three-dimensional preview generating system can identify defects of the input model 102. As used herein, the term "defect" refers to a problem (or potential problem) in relation to a three-dimensional model. In particular, the term "defect" refers to anomalies, errors, artifacts, or other issues in a three-dimensional model. In particular, the term "defect" includes holes or gaps at vertices or corresponding edges in a three-dimensional model. Similarly, the term "defect" includes flipped, duplicate, or overlapping modeling elements. For example, the term "defect" refers to artifacts in a three-dimensional model that prohibit printing the three-dimensional model utilizing a three-dimensional printer. For instance, the term "defect" includes self-intersecting faces (faces that intersect with other feces in the same mesh); isolated vertices, edges, and/or faces (e.g., a vertex or face that is not connected to the rest of a mesh or an edge connected on only one face); degenerate faces (e.g., faces with a zero area); holes (e.g., missing faces on a mesh); T-vertices (e.g., a vertex that meets an already existing edge; non-manifold edges (edges in a triangulated mesh with more than two faces attached to them); and/or folded faces (e.g., faces the surrounding faces of which have the opposite orientation, sometimes referred to as inverted normal). Additionally, the term "defect" includes other issues that undermine the accuracy, appearance, or functionality of a three-dimensional model. For example, the term "defect" includes areas of low structural integrity, areas where the model may be inaccurate (e.g., warped or inaccurate slopes or curved parts), or areas of extreme roughness. As used herein, various defects may refer to different types or categories of issues associated with the input model including, for example, printability issues, integrity issues, accuracy issues, and appearance issues.

As illustrated in FIGS. 2A-2E, the three-dimensional preview generating system performs one or more types of analyses of the input model 102 to identify any number of properties including visual characteristics and defects associated with printing an object based on the input model 102.

In particular, as will be described in further detail below, the three-dimensional preview generating system can perform one or more of a printability analysis, an integrity analysis, an accuracy analysis, or an appearance analysis on the input model 102 to identify any number of properties of the input model 102. As an example, the three-dimensional preview generating system performs one or more types of analyses on the input model 102 to identify visual characteristics, structural characteristics, and various defects of a printable object based on the input model 102.

As will be described in further detail below, upon analyzing the input model 102, the three-dimensional preview generating system can further generate one or more texture maps that reflect different analyses of the input model 102. As an example, in response to performing a printability analysis to identify various defects associated with printing a three-dimensional object based on the input model 102, the three-dimensional preview generating system can generate a printability texture map that includes an identification or visual representation of any number of printability defects for the input model 102. Additionally, the three-dimensional preview generating system can generate different printability texture maps that indicate different types of printability issues identified by a printability analysis. In one or more embodiments, the three-dimensional preview generating system generates a respective texture map (or multiple texture maps) for each analysis performed on the input model 102. Further, as described below with respect to FIGS. 2A-2E, the three-dimensional preview generating system can generate a texture map to illustrate different types of object properties for an object to be printed based on the input model 102.

As used herein, a "texture map" refers to an image or other representation that indicates one or more properties of a three-dimensional model (e.g., input model 102) and/or one or more properties of a physical object to be printed based on the three-dimensional model. For example, in one or more embodiments, a texture map refers to an image that includes one or more indicators of various properties associated with the input model 102. A texture map can include a mapping of a three-dimensional model including one or more visual indicators of identified properties of the three-dimensional model. For example, a texture map can include portions having different colors, indicators, or surface area properties that provide a visualization of various properties (e.g., defects) of a corresponding three-dimensional model. Additionally, as will be described in greater detail below, a particular texture map can highlight or indicate a single property of the three-dimensional model or, alternatively, multiple properties (or types of properties) of the three-dimensional model. In one or more embodiments, a particular texture map represents an analysis (or type of analysis) of a three-dimensional model.

In one or more embodiments, a generated texture map is applied to an underlying structure of an input model 102 to generate a three-dimensional representation of the input model 102 including a visualization of one or more properties of the input model 102 and/or properties of an object to be printed based on the input model 102. For example, in one or more embodiments, the three-dimensional preview generating system wraps a texture map around a mesh of the input model 102 to generate a three-dimensional rendering of an analysis of the input model 102 that provides a preview of one or more defects or other properties of an object to be printed from the input model 102. Further, as will be described in further detail below, the three-dimensional preview generating system can generate a three-dimensional rendering of a texture map for each type of analysis performed for the input model 102.

Figure 2A:
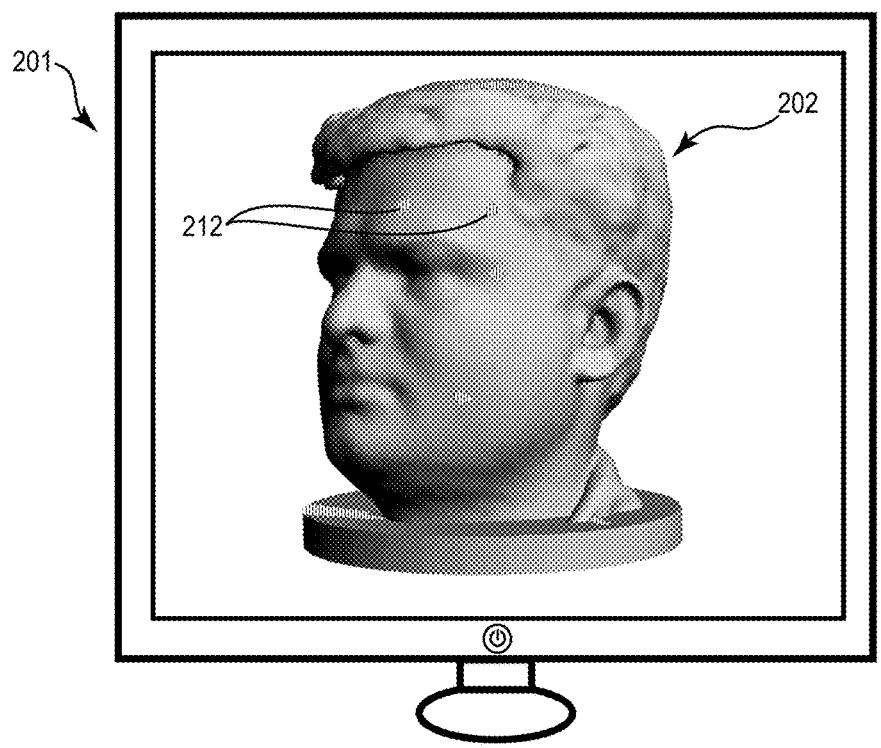
FIG. 2A illustrates a three-dimensional printability preview of the three-dimensional model in accordance with one or more embodiments.
Figure 2B:
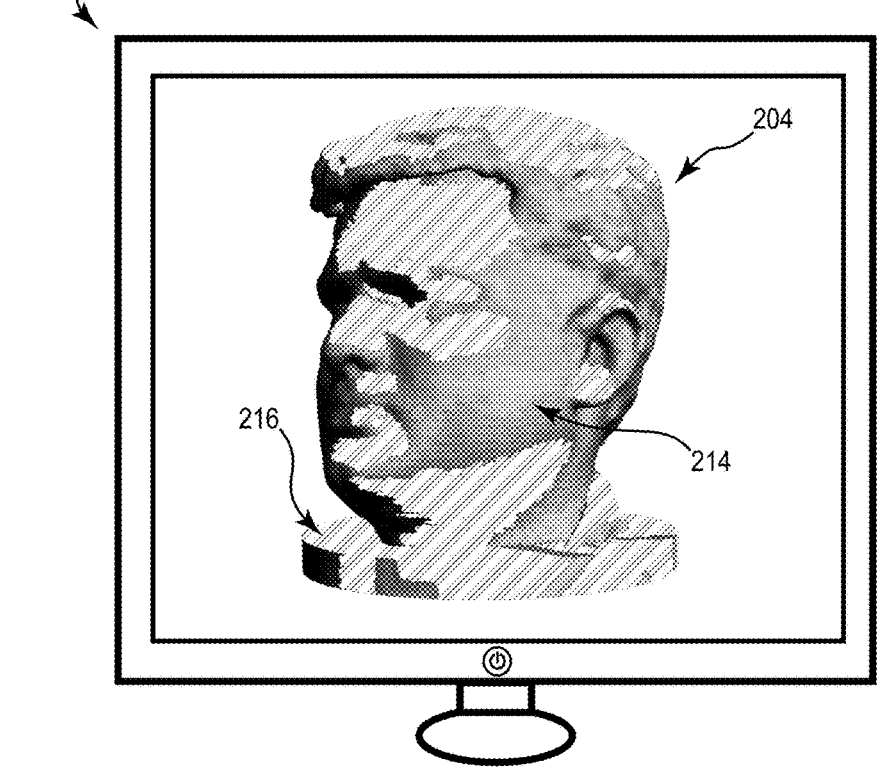
FIG. 2B illustrates a three-dimensional appearance preview of the three-dimensional model in accordance with one or more embodiments.
Figure 2C:
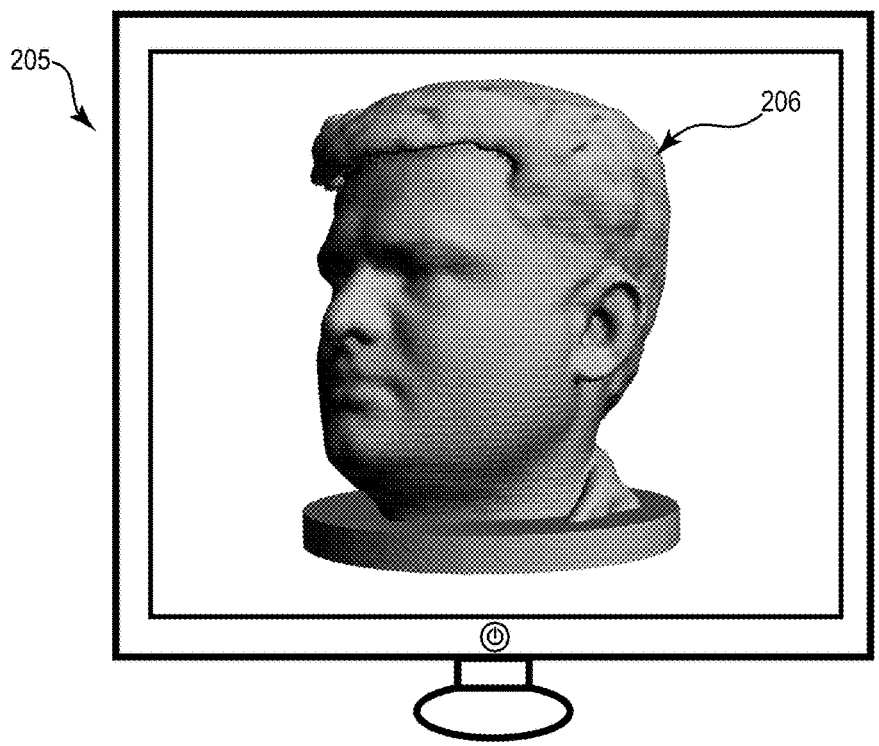
FIG. 2C illustrates a three-dimensional true-visual preview of the three-dimensional model in accordance with one or more embodiments.
Figure 2D:
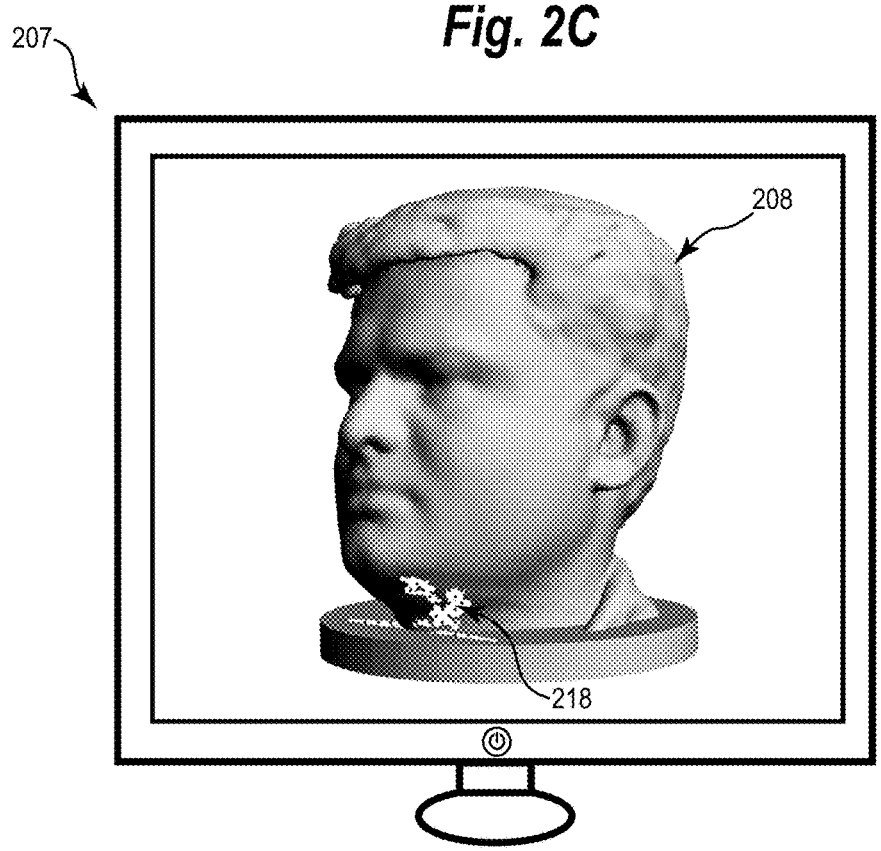
FIG. 2D illustrates a three-dimensional accuracy preview of the three-dimensional model in accordance with one or more embodiments.
Figure 2E:
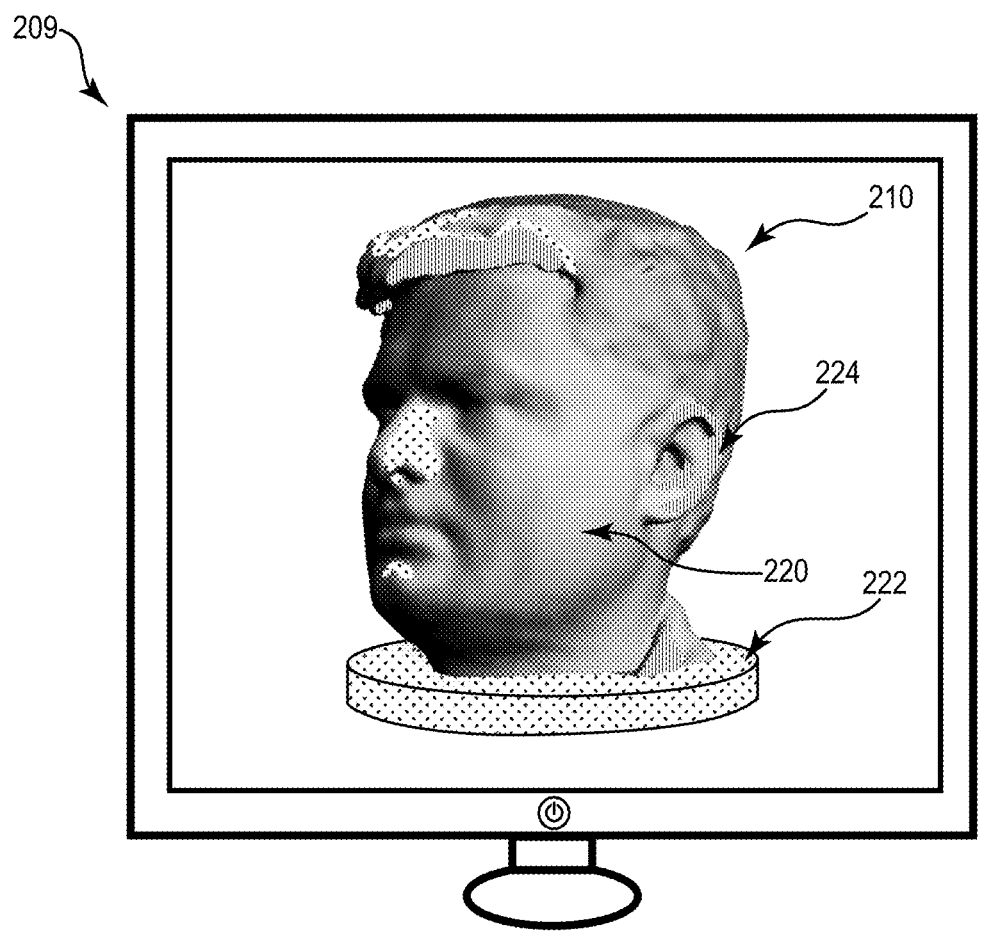
FIG. 2E illustrates a three-dimensional integrity preview of the three-dimensional model in accordance with one or more embodiments.
Figure 3:
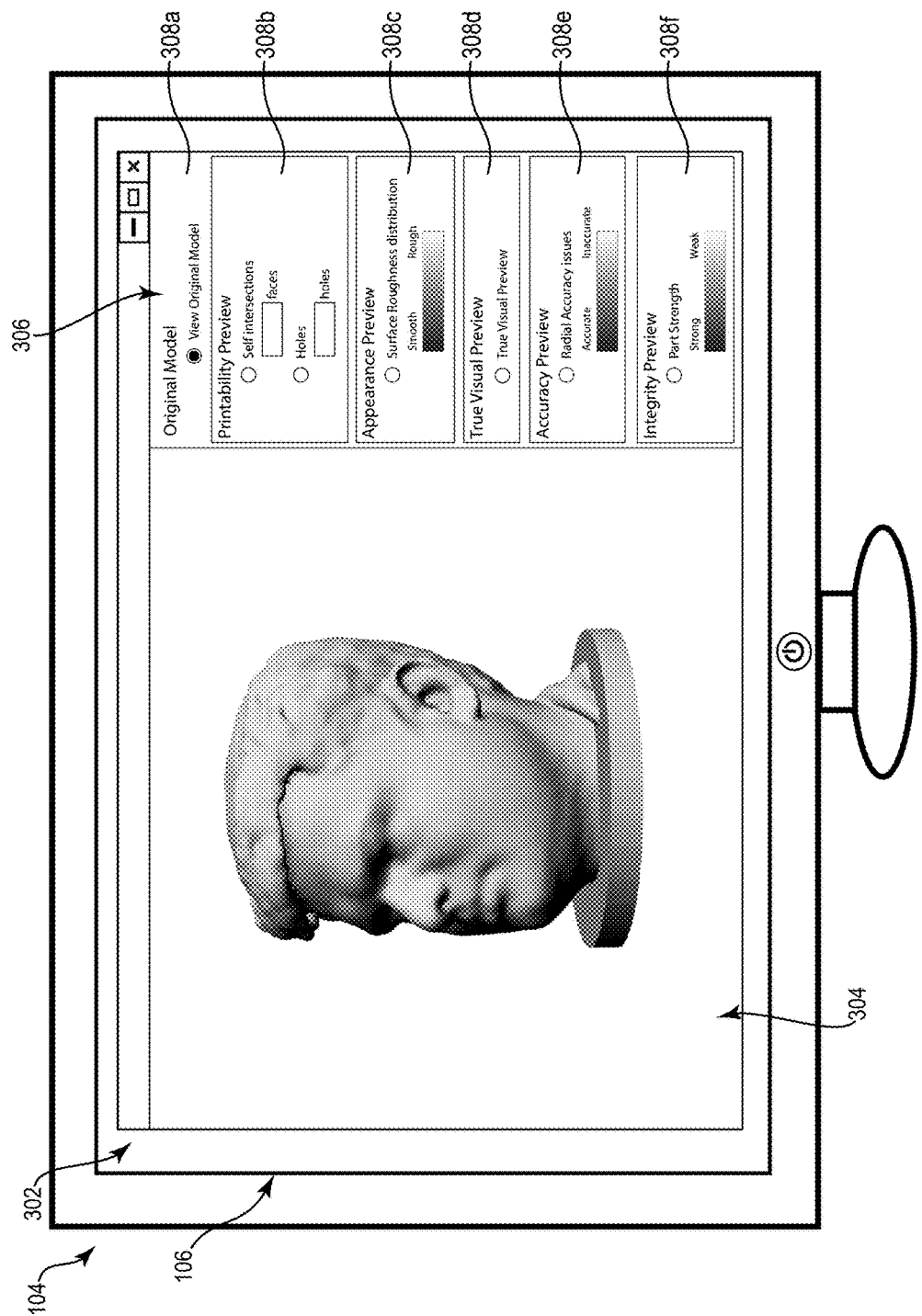
FIG. 3 illustrates a preview interface for the three-dimensional model in accordance with one or more embodiments.

To illustrate, FIGS. 2A-2E include three-dimensional previews 201, 203, 205, 207, 209 of different types of texture maps 202, 204, 206, 208, 210 based on different types of analyses of the input model 102 that the three-dimensional preview generating system can provide within a graphical user interface 106 of the computing device 104. For example, FIG. 2A illustrates a printability preview 201 including a three-dimensional rendering of a printability texture map 202 applied to the input model based on a printability analysis of the input model 102. FIG. 2B illustrates an appearance preview 203 including a three-dimensional rendering of an appearance texture map 204 applied to the input model based on an appearance analysis of the input model 102. FIG. 2C illustrates a true-visual preview 205 including a three-dimensional rendering of a true-visual texture map 206 applied to the input model based on a true-appearance analysis of the input model 102. FIG. 2D illustrates an accuracy preview 207 including a three-dimensional rendering of an accuracy texture map 208 applied to the input model based on an accuracy analysis of the input model 102. Further, FIG. 2E illustrates an integrity preview 209 including a three-dimensional rendering of an integrity texture map 210 applied to the input model based on an integrity analysis of the input model 102.

While FIGS. 2A-2E illustrate individual textures maps applied to the mesh of the input model 102, it is appreciated that the three-dimensional preview generating system can provide three-dimensional renderings of multiple textures applied to the mesh. For example, the three-dimensional preview generating system provides a printability preview including three-dimensional rendering that includes both an appearance texture map and an analysis texture map. As another example, a printability preview can include both the appearance texture map and the true-visual texture map. As will be described in further detail below with regard to FIG. 3, the three-dimensional preview generating system can embed any number of three-dimensional renderings of the texture maps within a portable document format (PDF) document that enables a user to view and interact with different three-dimensional renderings of the different texture maps.

As mentioned above, the three-dimensional preview generating system can generate each of the texture maps 202, 204, 206, 208, 210 based on respective types of analyses of the input model 102. It is appreciated that the three-dimensional preview generating system can utilize various types of methods and analyses to identify different defects and other properties of the input model 102. The following description includes example types of analyses to generate corresponding textures to apply to a mesh of the input model 102. It is appreciated that one or more embodiments utilize different analyses to identify similar or different properties of the input model 102. Thus, the following description of analyzing the input model 102 to generate the texture maps 202, 204, 206, 208, 210 illustrated in FIG. 2A-2E is intended to be illustrative of one or more embodiments in accordance with the present disclosure, and is not intended to limit potential embodiments. Alternative embodiments can include additional, fewer, or different steps for analyzing the input model 102 to generate different texture maps that highlight different properties of the input model 102 and/or an object to be printed based on the input model 102.

For example, FIG. 2A illustrates a printability preview 201 including a three-dimensional representation of a printability texture map 202 including one or more identified printing defects 212. For example, the three-dimensional preview generating system performs a printability analysis on the input model 102 and identifies any number of printing defects 212 that render the input model 202 unprintable as a three-dimensional object. In one or more embodiments, the three-dimensional preview generating system analyzes the mesh of the input model 102 to identify one or more issues associating with printing a three-dimensional object based on the input model 102. As used herein, the printing defects 212 refer to any features or properties of the input model that renders the input model 102 a non-manifold structure, thus violating one or more basic requirements of printability. Examples of printing defects 212 include T-vertices; isolated vertices, edges, and faces; mesh holes; degenerate faces; self-intersecting faces; non-manifold edges; folded faces; and other defects that violate basic rules of printability.

In one or more embodiments, the three-dimensional preview generating system performs a printability analysis for each of multiple types of printing defect 212 and generates a printability texture map 202 corresponding to each type of printing defect 212. Alternatively, in one or more embodiments, the three-dimensional preview generating system performs a printability analysis for multiple types of printing defects 212 and combines the results in a single printability texture map 202.

Thus, as mentioned previously, the three-dimensional preview generating system can analyze the input model 102 to identify any number of printability defects 212 and/or types of printability defects 212 in the input model 102. For instance, printability defects 212 include T-vertices, which refer to a vertex of a mesh (e.g., of the input model 102) that meets an already existing edge. As another example, the printability defects 212 include isolated vertices, edges, or faces, which refer to vertices, edges, or faces that are not connected to the rest of the mesh (or the largest connected component). The printability defects 212 can also include holes, which refer to missing faces in a mesh. The printability defects 212 can also include degenerate faces, which refers to faces of the mesh with zero area. The printability defects 212 can also include self-intersecting faces, which refers to faces that intersect with other faces in the same mesh. The printability defects 212 can also include non-manifold edges, which refers to edges in a triangulated mesh with more than two faces attached to them. The printability defects 212 can also include folded faces, which refer to faces having one or more surrounding faces of which have opposite orientations.

Moreover, each of the different types of printability defects may be indicated differently within the printability texture 202. For example, as shown in FIG. 2A, the printability defects 212 are indicated using striped portions of the three-dimensional rendering of the printability texture 202. Additionally, different printability defects may be indicated differently on the printability texture 202. For example, in one or more embodiments, the t-vertices are indicated by associating a color with a problematic vertex and an incident face of the mesh. As another example, isolated vertices, edges, and faces may be indicated by adding a bounding ellipsoid to an offending vertex, edge, face, or combination of multiple vertices, edges, and/or faces. Holes may be indicated by associating colors with vertices on the boundary of the hole. Non-manifold edges may be indicated by associating colors for vertices on which the edges are incident. Folded faces may be indicated by associating a color with all the vertices that constitute the folded face. Additionally, inverted faces may be normalized to make one or more triangles visible.

In one or more embodiments, rather than indicating each of the different types of printability defects 212 within the printability texture 202, the three-dimensional preview generating system simply corrects one or more printability defects 212. For example, in one or more embodiments, the three-dimensional preview generating system corrects degenerate faces (e.g., of the mesh for the input model 102) by removing them from the input model 102. Additionally, in one or more embodiments, the three-dimensional preview generating system removes self-intersecting faces from the mesh. Thus, the three-dimensional preview generating system can correct different types of printability defects 212 without providing a visual indication of the defects in the printability texture 202.

Additionally, in one or more embodiments, the three-dimensional preview generating system performs the printability analysis prior to performing one or more additional analyses of the input model 102. In this way, the three-dimensional preview generating system enables a user to remedy one or more of the printability defects 212 prior to performing different analyses on input model 102 that is incapable of printing to an object because the input model 102 would render the printable object as a non-manifold structure. As mentioned above, in one or more embodiments, the three-dimensional preview generating system corrects one or more of the printability defects 212 without providing a visual indication of the printability defects 212 to the user. Alternatively, in one or more embodiments, a user interacts with the printability texture 212 (or corresponding input model 202) to resolve some or all of the printability defects 212 prior to performing additional analysis on the input model 102.

Thus, generating the printability texture map 204 and correcting various printability defects 212 may result in a modified input model 102. Thus, in one or more embodiments, the three-dimensional preview generating system performs additional types of analysis on a modified version of the input model 102. Therefore, it is appreciated that one or more embodiments described herein that relate to performing various analyses of an input model 102 may refer to performing those analyses on a modified version of the input model 102 in which one or more of the printability issues 212 have been resolved.

In addition to performing the printability analysis to generate the printability preview 201, the three-dimensional preview generating system can perform an appearance analysis on the input model 102 to generate an appearance preview 203 that provides a visualization of one or more appearance characteristics of an object once printed. In particular, the appearance preview 203 illustrating the appearance texture map 204 provides a visualization of how portions of the printable object may appear once printed. As shown in FIG. 2B, the appearance texture map 204 includes a smooth region 214 and a rough region 216 at different portions of the appearance texture map 204. For example, as indicated in FIG. 2B, the appearance texture map 204 includes a gray portion indicating a smooth region 214 of a printed object and a striped portion indicating a rough region 216 of a printed object. It is appreciated that the appearance texture 204 can include other indicators to visualize a range of surface features. For example, in one or more embodiments, the appearance texture 204 includes a range from light to dark, or various colors, patterns, and/or visual indicators that illustrate how the surface of a printed object will appear.

Furthermore, while FIG. 2B illustrates an example embodiment of the appearance texture map 204 that includes indicators of roughness across regions of the appearance texture map 204, it is appreciated that the three-dimensional preview generating system can perform various calculations and analysis of the input model 102 to identify different appearance properties (e.g., surface features) of the input model 102 that are reflected in the generated appearance texture map 204. For example, as will be described in additional detail below, one or more embodiments of the three-dimensional preview generating system performs the appearance analysis by performing one or more of a surface roughness analysis or generation of a photorealistic preview.

For example, in one or more embodiments, the three-dimensional preview generating system generates the appearance texture map 204 by performing a surface roughness analysis on the input model 102. In particular, the three-dimensional preview generating system analyzes the input model 102 to calculate a surface roughness for portions of the printable object. This is performed by analyzing each vertex of the mesh and equalizing a histogram to obtain a distributed visualization of a surface of an object to be printed based on the input model 102. In one or more embodiments, the three-dimensional preview generating system utilizes a surface roughness estimation model based on angles of the surface of the input model 102 relative to a vertical orientation and the thickness of layers used to print the object. In this way, the three-dimensional preview generating system can calculate an average roughness across defined regions of the input model 102 to reflect within the appearance texture map 204.

In performing the surface roughness analysis, the three-dimensional preview generating system can utilize similar surface roughness calculation models described in "Improvement of Surface Finish by Staircase Machining in Fused Deposition Modeling by Pulak M. Pandey, N. Venkata Reddy, and Sanjay Dhande, which is incorporated by reference herein in its entirety. Additionally, or alternatively, the three-dimensional preview generating system can utilize surface roughness calculation models described in "Surface Roughness Estimation for FDM Systems" by Behnam Nourghassemi, which is also incorporated by reference in its entirety.

In addition, or as an alternative to the surface roughness analysis, the three-dimensional preview generating system can perform the appearance analysis by performing a photorealistic preview generation on the input model 102. In particular, the three-dimensional preview generating system can analyze various properties of the input model 102 as well as the material used to print the object to produce a texture that closely reflects an appearance of the surface of the printable object. Thus, the three-dimensional preview generating system can generate an appearance texture map 204 that provides an accurate picture of how the surface of the printed object will appear.

In one or more embodiments, the three-dimensional preview generating system performs the photorealistic preview generation by performing multiple passes on the input model 102 to determine different appearance properties of a printed object. As a first example pass, the three-dimensional preview generating system analyzes color properties of the three-dimensional printer. For printers that utilize fusion deposition modeling (FDM), the three-dimensional preview generating system determines a color value for a particular material and printer. This may be performed using a standard color management pipeline and/or measuring the color value with a spectrophotometer. Additionally, for printers that utilize a full color spectrum (e.g., binderjet/polyjet), the three-dimensional preview generating system can determine an appropriate color for the appearance texture 204 based on a trial and error of test targets and using a spectrophotometer.

As a second example pass, the three-dimensional preview generating system analyzes the input model 102 to calculate baking shadows to include within the appearance texture map 204. In particular, the three-dimensional preview generating system computes shadows of the input model 102 by calculating a volumetric obscurance on a per vertex basis, and interpolating volumetric obscurance values for respective vertices of the mesh. In one or more embodiments, the three-dimensional preview generating system calculates volumetric obscurance values of the input model 102 using one or more calculation methods described in "Fast Realistic Lighting for Video Games" by A. Iones, A. Krupkin, M. Sbert, and S. Zhukov, which is incorporated by reference in its entirety.

As a third example pass, the three-dimensional preview generating system analyzes the input model 102 to generate a bump-map. In particular, the three-dimensional preview generating system can analyze each vertex of the mesh of the input model 102 and determine a height and/or magnitude of a bump to visualize in the appearance texture map 204. For example, at each vertex (e.g., U-v coordinate) of the input model 102, the three-dimensional preview generating system calculates a bump-map characteristic (y) in view of a z-coordinate of the vertex, a height (h), and a magnitude of a bump at the vertex. In one or more embodiments, the three-dimensional preview generating system calculates the bump-map characteristic using the following equation:

$$y = bumpScale * \left[\left(1 + \sin\left(\frac{\pi z}{h}\right)\right) + \left(0.1 * e^{-10*\left(1 + \sin\left(\frac{\pi z}{h}\right)\right)}\right)\right]$$

where z represents a z-coordinate of a given vertex, bumpScale represents a magnitude of a bump at the z-coordinate on the input model 102, h represents a layer height.

In one or more embodiments, the three-dimensional preview generating system converts a calculated bump-map value for a given vertex to a gray value (e.g., 0-255). In one or more embodiments, this involves normalizing the values and multiplying by 255 (or other number corresponding to a granularity of the gray value scale. Upon converting the bump-map value, the three-dimensional preview generating system converts the converted value to the appearance texture map 204 to represent bumps and other surface characteristics that will appear on the three-dimensionally printed object.

It is appreciated that the appearance texture map 204 can include a visualization of one or more values obtained using one or more of the appearance related values described above. For example, in one or more embodiments, the appearance texture map 204 includes colors, patterns, or other indicators that visualize the results of the surface roughness analysis, photorealistic preview generation, and/or bump-map calculation. Alternatively, in one or more embodiments, the appearance texture map 204 includes a representation of a single appearance-related analysis described above. Further, in one or more embodiments, the three-dimensional preview generating system generates a separate appearance texture map 204 for individual appearance-based analyses described above.

Additionally, in one or more embodiments, the three-dimensional preview generating system performs a true-visual analysis on the input model 102 to generate a true-visual texture map 206 that provides a true-visualization of how a three-dimensionally printed object will appear. For example, in some instances, the three-dimensional preview generating system modifies the input model 102 (or a texture representative of the input model 102) in accordance with limited capabilities of a printing device. In particular, where the input model 102 includes angles, dimensions, and other physical characteristics that exceed the capabilities of a three-dimensional printer, the three-dimensional preview generating system can modify the input model 102 to generate a true-visual texture map 206 that accurately reflects limited capabilities and/or various settings of a printing device. For example, as shown in FIG. 2C, the three-dimensional preview generating system generates a true-visual preview 205 illustrating a three-dimensional rendering of the true-visual texture map 206 that reflects how an object will appear in view of limitations associated with printing the three-dimensional object based on the input model 102.

In generating the true-visual texture map 206, the three-dimensional preview generating system can analyze the mesh of the input model 102 and modify portions of the mesh in accordance with limitations of the printer. For example, in one or more embodiments, the three-dimensional preview generating system performs mesh decimation to the input model 102 to produce a modified object model that includes fewer faces while preserving as much as possible visual features of the input model 102. In particular, the three-dimensional preview generating system can decimate the mesh by removing any number of vertices and collapsing any number of edges of the mesh of the input model 102.

For example, in one or more embodiments, the three-dimensional preview generating system first selects vertices of the mesh to be removed. Additionally, the three-dimensional preview generating system performs a quadric error calculation to identify vertices of the mesh that may be removed while preserving the physical appearance of the input model 102. In one or more embodiments, the three-dimensional preview generating system utilizes similar quadric error metrics described in "Surface Simplification Using Quadric Error Methods" by Michael Garland and Paul S. Heckbert, which is incorporated by reference herein in its entirety.

Additionally, the three-dimensional preview generating system can select vertices to be removed or modified that avoid causing topological changes to the mesh of the input model 102. As an example, the three-dimensional preview generating system utilizes a decimation algorithm that prevents removal of vertices that would otherwise change the topology (e.g., surface roughness, vertex height) of the mesh of the input model 102. Thus, the three-dimensional preview generating system can preserve the shape and surface topology of the input model 102 when generating the true-visual texture map 206 that more realistically reflects the capabilities of the three-dimensional printer.

As mentioned above, the three-dimensional preview generating system can modify the input model 102 to generate the true-visual texture map 206 using a decimation algorithm that calculates modifications to x, y, and z coordinates of vertices of the input model 102. As an example, with regard to the z-coordinate, the three-dimensional preview generating system performs an iterative decimation algorithm over all vertices (v) in a triangulated mesh (D). In particular, the three-dimensional preview generating system initializing S[v] for each vertex (v) in triangulated mesh (D). The three-dimensional preview generating system further computes a centroid (v') of all vertices ($t_v$) such that ($t_v$, v)

is an edge in D. If dVz<dz, then the three-dimensional preview generating system determines that the vertex is a good candidate from the Z-direction standpoint. The three-dimensional preview generating system normalizes S[v] based on a predetermined value. For example, the three-dimensional preview generating system sets S[v]=S[v]+ 0.33. Otherwise, if dVz is not less than dz, then the three-dimensional preview generating system computes a potential error in the z-direction as $E_h$=|dVz−dz*floor(dVz/ dz)/dz and set S[v]=S[v]+$E_h$/3. It is noted that the mesh resolution in X, Y, and Z are denoted by dx, dy, and dz respectfully. Further, it is noted that dz refers to a selected layer height for the printer. Additionally, dV refers to a vector from the centroid to a candidate vertex.

With regard to x and y coordinates of the input model 102, the three-dimensional preview generating system applies Laplacian smoothing to all vertices to determine sharp features in the mesh. The vertices that significantly differ between the smooth and original mesh may represent the sharp features. The three-dimensional preview generating system can further generate an output mesh based on the output of the Laplacian smoothing of the vertices.

The three-dimensional preview generating system can further analyze each of the resulting vertices to smooth edges between vertices of the resulting model. As an example, for all vertices (v') in a modified triangulated mesh (D'), the three-dimensional preview generating system first finds the nearest neighbor vertex (v) in triangulated mesh (D). Next, the three-dimensional preview generating system computes difference vector (dV) as dV=v−v'=$[dV_x\ dV_y\ dV_z]^T$. If $dV_x$<dx, then S[v]=S[v]+0.33. Otherwise, the three-dimensional preview generating system computes the potential error in the z-direction as $E_x$=|$dV_x$−dx*floor($dV_x$/ dx)| and sets S[v]=S[v]+$E_x$/3. Further, if $dV_x$<dx, then the three-dimensional preview generating system sets S[v]=S [v]+1.0. Otherwise, the three-dimensional preview generating system computes the potential error in the z-direction as $E_y$=|$dV_y$−dy*floor ($dV_y$/dy)|/dy and sets S[v]=S[v]+$E_y$/3. Further, the three-dimensional preview generating system finds the vertex set V'={v|v∈V and S[v]>t}, where t is a pre-defined threshold.

It is appreciated that the three-dimensional preview generating system can determine how many and which vertices to remove based on the printing capabilities of the three-dimensional printer. Additionally, in one or more embodiments, the three-dimensional preview generating system determines possible errors or permissible vector lengths (e.g., between centroids and vertices) based on printing capabilities of the printer. For example, if the printer is capable of printing high resolution three-dimensional objects, the three-dimensional preview generating system removes fewer vertices from the mesh than if the printer is not capable of printing high resolution three-dimensional objects.

Additionally, as discussed above and shown in FIG. 2C, the three-dimensional preview generating system can apply the results of the true-value analysis to a true-value texture map 206. The three-dimensional preview generating system can further generate the true-visual preview 205 illustrating a three-dimensional rendering of the true-value texture map 206 in view of the modified mesh to provide a preview of how an object would appear when printed by a particular printer having limited capabilities and/or applicable settings or configurations. In particular, the three-dimensional preview generating system generates a three-dimensional rendering of the true-value texture map 206 having a resolution that corresponds to the resolution capabilities and applicable settings of the three-dimensional printer.

In one or more embodiments, the three-dimensional preview generating system performs an accuracy analysis on the input model 102 to generate an accuracy preview 207 including a three-dimensional rendering of an accuracy texture map 208 that provides a visualization of inaccuracies of the input model 102. In particular, the three-dimensional preview generating system can perform one or more accuracy calculations on the input model 102 in view of printing limitations, printing material, and dimensions of the input model 102 to identify resulting differences (e.g., accuracy defects) between the input model 102 and a resulting object to be printed based on the input model 102. As will be described in greater detail below, performing the accuracy analysis may involve performing multiple types of analyses or calculations. For example, in one or more embodiments, performing the accuracy analysis involves generating a warp estimation model, performing a slope accuracy test, and/or performing a radial dimension accuracy test for curved parts of the input model 102.

In one or more embodiments, the three-dimensional preview generating system performs the accuracy analysis of the input model 102 by generating a warp estimation model for the printable object. In particular, the three-dimensional preview generating system generates a three-dimensional representation of the input model 102 that approximates one or more distortions of a resulting printed object from the input model. In one or more embodiments, the three-dimensional preview generating system utilizes a medial axis transform to identify points of topology changes along the input model 102. Additionally, a principal length of the input model 102 at different heights along a medial axis is used as a section length input to calculate the warp deformation estimation model. Additional inputs that the three-dimensional preview generating system uses to generate the warp deformation estimation model includes a bed temperature, a chamber temperature, a linear shrinkage coefficient for the printing material, a layer height and number, and a section length. In one or more embodiments, the three-dimensional preview generating system utilizes one or more estimation methods described in "A Model Research for Prototype Warp Deformation in the FDM Process" by Tian-Ming Wang, Jun-Tong Xi, and Ye Jin, which is incorporated by reference in its entirety. In addition, the three-dimensional preview generating system can utilize one or more estimation methods described in "Accuracy Prediction in Fused Deposition Modeling" by A. Boschetto & L. Bottini, which is incorporated by reference in its entirety.

In addition, the three-dimensional preview generating system can perform the accuracy analysis of the input model 102 by performing a slope accuracy test. For example, based on empirical testing of the particular printer model, the three-dimensional preview generating system performs a slope accuracy test to determine an average angle offset fraction (f) and a standard angle step (s), referring to a step size that the particular printer is able to reproduce accurately at a reference section size. For example, the three-dimensional preview generating system calculates an error in the slope (t, for values>0 degrees) of a triangle using the following equation:

$$dt = t - s * \mathrm{floor}(t/(f+s))$$

where dt refers to a calculated error in a slope, t refers to a slope of a triangle in the input model 102, s refers to a standard angle step of a printer, and f refers to an average angle offset fraction.

Moreover, in one or more embodiments, the three-dimensional preview generating system performs the accuracy analysis by performing a radial dimensional accuracy test for curved parts of the input model 102. For example, based on empirical tests on a particular printer model, the three-dimensional preview generating system determines a projected accuracy of radial dimensions of a printed object for portions of the printed object corresponding to curved surfaces of the input model 102. In particular, the three-dimensional preview generating system can consider the x-y resonance and accuracy of gantry movement of the input model 102 to determine resulting radial dimensions of the curved surfaces. Additionally, the curved surfaces are identified as vertices with high Gaussian curvature values using one or more methods described in "Discrete Schemes for Gaussian Curvature and Their Convergence" by Zhiquang Xu and Guoliang Xu, which is incorporated by reference in its entirety.

As described above, based on the accuracy analysis, the three-dimensional preview generating system can generate an accuracy texture map 208 that includes indicators of inaccuracies 218 between the input model 102 and a resulting printed object. For example, as shown in FIG. 2D, the accuracy texture map 208 includes a dotted portion indicating inaccuracies 218 between the input model 102 and a resulting object printed based on the input model 102.

The three-dimensional preview generating system can generate one or more accuracy texture maps 208 based on a warp deformation estimation, slope accuracy test, and/or radial dimension accuracy test. In one or more embodiments, the three-dimensional preview generating system generates a separate texture map for each of the above identified calculation methods. Alternatively, in one or more embodiments, the three-dimensional preview generating system generates an accuracy texture map 208 including indicators of inaccuracies 218 identified from multiple accuracy-related calculation methods including, for example, those described above.

Additionally, in one or more embodiments, the three-dimensional preview generating system performs the integrity analysis of the input model 102 to generate an integrity texture map 210 that provides a visualization of structural quality at different regions of the input model 102. In particular, the three-dimensional preview generating system can analyze the input model 102 to identify which portions of a printed object will be structurally sound and/or structurally weak. For example, as shown in FIG. 2E, the three-dimensional preview generating system performs one or more structural calculations on the input model 102 to identify strong structural portions 220, intermediate structural portions 222, and weak structural portions 224 of a printable object. Additionally, in one or more embodiments, performing the integrity analysis involves performing one or a combination of different calculations or analyses associated with the structure of the printable object. For example, in one or more embodiments, performing the integrity analysis includes performing as small parts analysis, performing a shell thickness analysis, and/or performing an overhand and support analysis.

As mentioned above, performing the integrity analysis can involve performing a small part analysis of the input model 102. For example, the three-dimensional preview generating system performs a volumetric computation on the input model 102 that associates each region of the mesh a diameter value, which serves as a metric for determining which parts of a printed object will potentially break. The three-dimensional preview generating system further compares a determined diameter value for a particular region of the input model 102 to one or more threshold values corresponding to structural strength of a printable object. In one or more embodiments, the three-dimensional preview generating system determines various diameter measurements using one or more functions described in "Consistent Mesh Partitioning and Skeletonisation using the Shape Diameter Function" by Lior Shapira, Ariel Shamir, and Daniel Cohen-Or, which is incorporated in its entirety by reference.

The three-dimensional preview generating system can further indicate portions of structural strength within the integrity texture map 210 based on the comparison of calculated diameters and threshold values. As an example, the three-dimensional preview generating system associates different colors with different ranges of diameter values corresponding to structural strength of portions of a printable object. As such, an integrity texture map 210 can include colors ranging from light to dark to indicate a wide range of structural quality of the printable object. For example, as shown in FIG. 2E, the integrity preview 209 illustrates a integrity texture map 210 including indicators of strong structural portions 220, intermediate structural portions 222, and weak structural portions 224 of a printable object. In particular, as shown in FIG. 2E, strong structural portions 220 are indicated by a gray pattern, intermediate structural portions 222 are indicated by a dotted pattern, and weak structural portions 224 are indicated by a striped pattern. In one or more embodiments, the integrity texture map 210 includes any number of different shades, colors, hues, or other indicators to indicate portions of a printable object having varying levels of structural integrity.

Alternatively, in one or more embodiments, the three-dimensional preview generating system simply identifies structurally weak portions of the printable object by comparing the calculated diameter values to a single threshold value and indicating portions of structural weakness within the integrity texture map 210. It is appreciated that the integrity texture map 210 can include any number of indicators corresponding to a wide range of structural quality for a printable object. Further, it is appreciated that the integrity texture map 208 can include indicators other than color including, for example, patterns or other visual indicators, as shown in FIG. 2E.

In addition to the small parts analysis, in one or more embodiments, the performing the structural analysis involves performing a shell thickness analysis of the input model 102. For example, in one or more embodiments, the three-dimensional preview generating system performs a shell thickness analysis on the input model 102 to determine thickness parameters across portions of a printable object. In particular, the three-dimensional preview generating system can perform a shell thickness analysis that identifies portions of the mesh corresponding to a printable object that are susceptible to breaking during or after printing the object based on the input model 102. In one or more embodiments, the three-dimensional preview generating system only performs the shell thickness analysis for a printable object having a hollow interior. Alternatively, the three-dimensional preview generating system can perform the shell thickness analysis for solid printable objects.

The three-dimensional preview generating system can perform a variety of methods for identifying the thickness of a printed object. For example, in one or more embodiments, the three-dimensional preview generating system receives the mesh of the input model 102 and a threshold thickness as inputs. For each face of the mesh, the three-dimensional preview generating system stores a vulnerability score (F Score) initialized to zero. Additionally, for each vertex, a vertex score (VScore) is initialized to zero. The three-dimensional preview generating system represents slices of a mesh as a grid of voxels. For each slice, the three-dimensional preview generating system identifies connected components in the voxel grid and checks whether components completely lie inside one another. For each voxel of the slice completely in the interior component, the three-dimensional preview generating system finds the closes point exterior to the slice and, if the distance between the two is below the received threshold thickness, the three-dimensional preview generating system increments the FScore for all faces that are part of a corresponding octree node (Of the mesh). For any vertex (v) of the mesh, the three-dimensional preview generating system adds the Fscore for any face that is incident on the vertex (v) to the VScore for the vertex (v). The three-dimensional preview generating system then normalizes the Vscore.

Further, similar to one or more analyses described above, the three-dimensional preview generating system assigns a color scheme to each vertex to be visualized in the integrity preview 209. For example, in one or more embodiments, the three-dimensional preview generating system assigns a color spectrum ranging from 0-255 where 0 is represented by red indicating portions of the integrity texture map 210 of extreme structural vulnerability to 255 represented by green indicating portions having a high value of structural integrity. Additionally, as illustrated in FIG. 2E, areas of structural vulnerability can be represented using patterns, shades, or other visual indicators.

Additionally, in one or more embodiments, the structural analysis includes an overhang and support analysis that identifies overhang structures of the input model 102. For example, the three-dimensional preview generating system analyzes slices of the mesh of the input model 102 and identifies overhanging parts of the mesh that have slopes higher than an angle of the overhang, thus indicating structurally vulnerable portions of the printable object and providing indicators within the integrity texture map 210 that enable a user to remove or modify portions of the input model 102 to be more structurally sound.

The three-dimensional preview generating system can perform a variety of methods and calculations to identify overhang structures of the input model 102. As an example, in one or more embodiments, the three-dimensional preview generating system receives a threshold angle (T) for an overhang. The three-dimensional preview generating system records a vertex score (VOverhang) for each vertex (v) of a mesh and initializes the vertex score (VOverhang) to 0 (False). The three-dimensional preview generating system further identifies each normal face of the mesh. For each normal face, the three-dimensional preview generating system calculates an angle between normal and the xy-plane in the negative direction. If the angle is larger than the threshold angle (T), then the face is an overhanging face. The three-dimensional preview generating system then marks the vertex score (VOverhang) of each vertex (v) of the face as 1 (true). The three-dimensional preview generating system then assigns a color scheme to the integrity texture map 210 corresponding to the identified 0 or 1 value, indicating the presence or absence of an overhang structure at a particular portion of the input model 102.

It is appreciated that each of the different types of analyses may be represented using a different visualization scheme. For example, the three-dimensional preview generating system can include dots, lines, or other indicators at vertices, lines, or faces of the mesh to illustrate individual defects of the input model 102. Additionally, the three-dimensional preview generating system can indicate different properties or defects using different shades of gray, patterns, and/or colors.

Further, in representing different visual features, the three-dimensional preview generating system can represent different colors, shades, or patterns differently between different vertices, faces, or lines of the mesh having different identified properties. As an example, upon performing an analysis of the input model 102, the three-dimensional preview generating system can receive UV coordinates for each vertex of the mesh, vertex attributes (V) representing, for instance, a value between 0 and 1 (or equivalently, a color (e.g., RGB) assigned from a color scheme), and an image width (W) and height (H). For each face (F) of the mesh having UV coordinates (u,v), the three-dimensional preview generating system calculates a triangle value as a function of X and Y where X=u×W and Y=(1.0v)×H. The three-dimensional preview generating system further rasterizes the triangle. For each pixel inside T, the three-dimensional preview generating system interpolates the color values by interpolating over each channel (RGB) using barycentric coordinates over the three colors of each of the vertices in the triangle. Where a pixel is already assigned a color, the three-dimensional preview generating system applies a linear blending with the underlying color.

As mentioned above, the three-dimensional preview generating system utilizes the results of one or more analyses of the input model 102 to generate a portable three-dimensional preview (or multiple previews) of a printable object. In particular, as described above, the three-dimensional preview generating system can apply one or multiple texture maps to a mesh of the input model 102 to generate three-dimensional renderings of the texture maps representing one or more of the analyses described above. For example, as shown in FIG. 3, the three-dimensional preview generating system embeds the previews 201, 203, 205, 207, 209 of the different texture maps 202, 204, 206, 208, 210 without a portable document format (PDF) document. Additionally, as shown in FIG. 3, the three-dimensional preview generating system can provide a preview interface 302 presented within a graphical user interface 106 of the client device 102.

In particular, as shown in FIG. 3, the three-dimensional preview generating system generates an interactive PDF document that enables a user to view and interact with three-dimensional renderings of the various texture maps applied to the mesh of the input model. For example, as shown in FIG. 3, the three-dimensional preview generating system provides a preview interface 302 including multiple portions including, for example, an interactive preview 304 and a preview menu 306. In particular, as shown in FIG. 3, the interactive preview 304 includes a three-dimensional rendering of the true-visual texture map 206 applied to the mesh of the input model described above. It is appreciated that the interactive preview 304 can include a three-dimensional rendering of any of the texture maps described herein. Additionally, as shown in FIG. 3, the interactive preview 304 includes multiple three-dimensional renderings of multiple texture maps.

As mentioned above, and as shown in FIG. 3, the preview interface 302 includes a preview menu 306 that enables a user to selectively view different three-dimensional renderings of the texture maps within the interactive preview 304. In one or more embodiments, the preview menu 306 includes selectable options corresponding to different texture maps that causes the interactive preview 304 to switch between different previews of corresponding texture maps (e.g., in response to a user selection of a menu option). For example, as shown in FIG. 3, the preview menu 306 includes an input model option 308a, a printability option 308b, an appearance option 308c, a true-visual option 308d, an accuracy option 308e, and an integrity option 308f. Each of the options correspond to three-dimensional representations of respective texture maps applied to the mesh of the input model.

In one or more embodiments, a user selects one of the options to select a texture map to display within the interactive preview 304. The user can select the true-visual option 308d to provide a three-dimensional rendering of the true-visual texture map 206 applied to the mesh of the input model. The user can further select any of the selectable options 308a-f to modify the interactive preview 304 to display a selected three-dimensional rendering of a selected texture map applied to the mesh of the input model. In one or more embodiments, the interactive preview 304 displays a three-dimensional rendering of whichever selectable option 308a-f has been selected. Alternatively, in one or more embodiments, the interactive preview 304 includes multiple three-dimensional renderings of multiple selected options 308a-f.

In one or more embodiments, the interactive preview 304 includes a display of multiple three-dimensional renderings of respective texture maps applied to the mesh of the input model. For example, in one or more embodiments, the interactive preview 304 includes two or more three-dimensional renderings by displaying two or more texture maps applied to the mesh of the input model 102. Alternatively, in one or more embodiments, in response to detecting a selection of multiple selectable options 308a-f, the three-dimensional rendering includes multiple texture maps layered over the same mesh. For example, if a user selects an appearance option 308c and an accuracy option 308e, the three-dimensional rendering within the interactive preview 304 includes a mesh of the input model 102 including both the appearance texture map 204 and the accuracy texture map 208. Each of the texture maps can include different indicators to illustrate different types of properties corresponding to respective texture maps. For instance, in one or more embodiments, the appearance texture map 204 includes different colors indicating rough or smooth portions of the printable object. Additionally, the accuracy texture map 208 can include dark or light areas to indicate portions of similarity or difference between the input model 102 and the printable object.

Additionally, as shown in FIG. 3, each of the selectable options of the preview menu 306 include one or more selectable features to further modify or identify available previews for the input model 102. For example, the printability option 308b includes selectable printability features associated with specific printability issues (e.g., self-intersections, holes) identified by performing respective analyses of the input model 102. Additionally, one or more of the menu options include types of indicators and associated features of respective previews. For example, as shown in FIG. 3, the appearance option 308c identifies that an appearance texture map 204 includes dark portions that correspond to portions of a printable object that will be smooth and light portions that correspond to portions of the printable object that will be rough. Other menu options include similar types of visualizations to show how certain features of a printable object will be illustrated in a respective texture map.

In one or more embodiments, the preview interface 302 enables a user to interact with and modify a view or angle of the interactive preview 304. In particular, the preview interface 302 enables a user to interact with a three-dimensional rendering to zoom in and rotate the three-dimensional rendering to provide different perspectives of a printable object. Thus, in the example shown in FIG. 3, a user can interact with the printable object within the interactive preview to view the top, bottom, or side perspective of the printable object including any number of indicators shown by one or more of the texture maps.

As mentioned above, the three-dimensional preview generating system can embed the texture maps and three-dimensional renderings in a PDF document format. For example, the three-dimensional preview generating system embeds the three-dimensional renderings in a three-dimensional PDF document format. In one or more embodiments, the three-dimensional preview generating system includes only the texture maps and associated meshes within the PDF document to generate a lightweight document that provides different previews of the input model 102 without including all data necessary to print the printable object. Rather, the PDF document includes preview data that enables a user to view a preview of the document, but does not necessarily include all data used to perform the various types of analysis of the input model 102 or all of the data of the original or modified input model 102. Thus, the PDF document including the embedded texture maps provides a lightweight and portable document that is transferable between users and/or may be displayed within a web browser interface.

Figure 4:
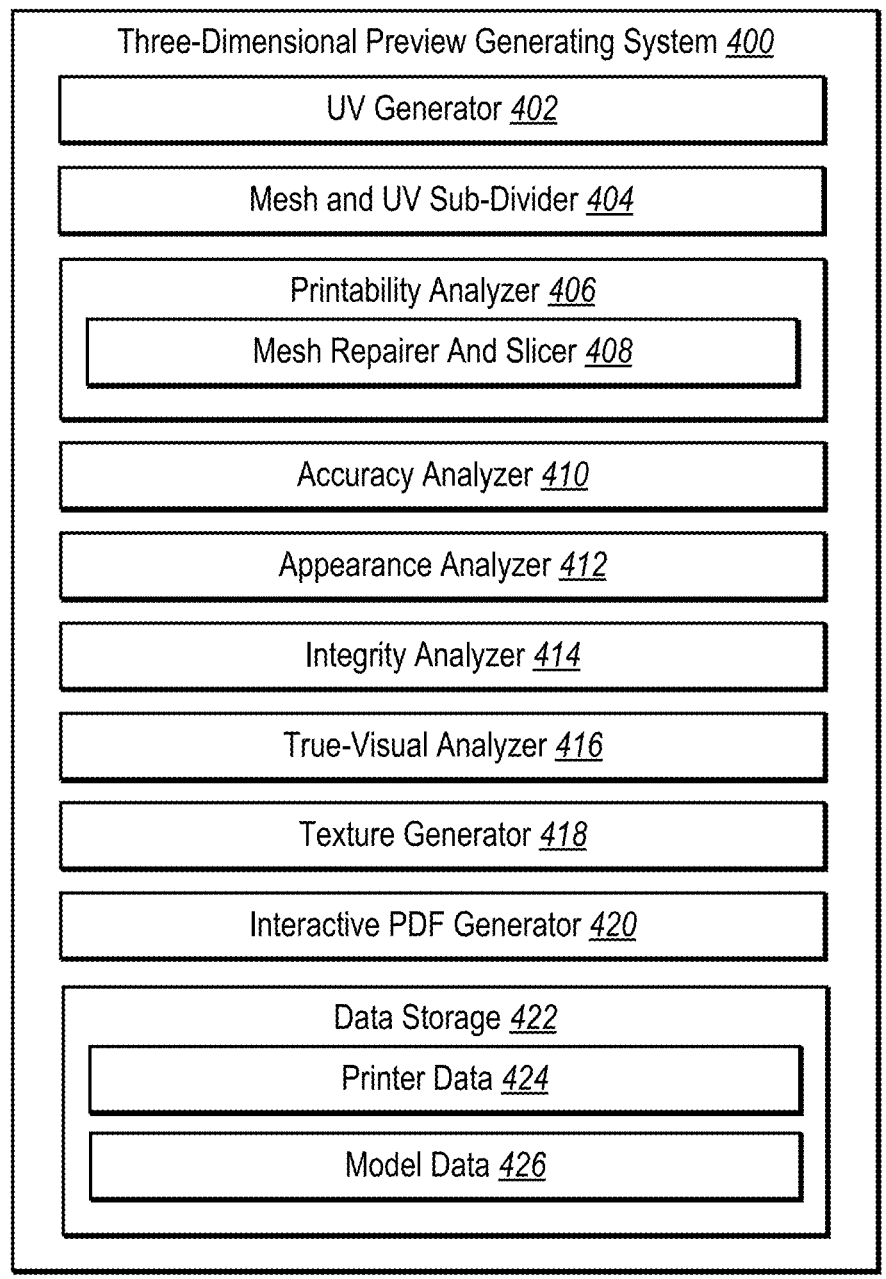
FIG. 4 illustrates a schematic diagram of an example three-dimensional preview generating system in accordance with one or more embodiments.

Turning now to FIG. 4, additional detail will be provided regarding components and capabilities of an example architecture for a three-dimensional preview generating system 400 that may be implemented on a computing device in accordance with one or more embodiments. In particular, FIG. 4 illustrates an embodiment of an exemplary three-dimensional preview generating system 400 that accomplishes features and functionality associated with one or more embodiments described above. For example, the three-dimensional preview generating system 400 analyzes an input model 102 to generate a three-dimensional preview including a visualization of identified properties of an object to be printed based on the input model 102.

As shown in FIG. 4 the three-dimensional preview generating system 400 includes a UV generator 402, a mesh and UV sub-divider 404, a printability analyzer 406, a mesh repairer and slicer 408, an accuracy analyzer 410, an appearance analyzer 412, an integrity analyzer 414, a true-visual analyzer 416, a texture generator 418, an interactive PDF generator 420, and a data storage 422 including, for example, printer data 424 and model data 426.

As illustrated in FIG. 4, the three-dimensional preview generating system 400 includes a UV generator 402. In particular, the UV generator 402 receives, generates, or otherwise obtains a UV map or texture map for an input model 102. For example, in one or more embodiments, the UV generator 402 utilizes a parameterization algorithm (e.g., a conformal flattening algorithm) to compute u-v coordinates for each vertex of the input model 102. In one or more embodiments, the UV generator 402 generates a texture map for the input model 102 that includes u-v coordinates for the mesh of the input model 102. In one or more embodiments, the generated texture map for the input model 102 is provided via a three-dimensional rendering described above in connection with FIGS. 2A and 3.

As further illustrated in FIG. 4, the three-dimensional preview generating system 400 includes a mesh and UV sub-divider 404. In particular, the mesh and UV sub-divider 404 compares edges of the mesh to a threshold length to identify large triangles in the mesh of the input model 102. The mesh and UV sub-divider 404 further sub-divides the triangles using barycentric subdivision and generates corresponding U-v coordinates for the sub-divided triangles. Thus, the three-dimensional preview generating system 400 can provide visualizations of identified properties at more fine granularity (or more gradually between adjacent vertices) when providing the three-dimensional preview of generated texture maps. For example, when providing a visualization that includes a range of colors, a preview illustrates a gradual change of color between vertices of larger triangles.

As further shown in FIG. 4, the three-dimensional preview generating system 400 includes a printability analyzer 406. In particular, the printability analyzer 406 can analyze the input model 102 to identify one or more printability defects of the input model 102 that would render the input model 102 unprintable by a three-dimensional printer. It is appreciated that the printability analyzer 406 can include any number of the features and functionality described above in connection with analyzing the input model 102 to identify various printability properties (e.g., defects) described above. For example, the printability analyzer 406 analyzes the input model 102 to identify defects including, for example, self-intersecting faces; isolated vertices, edges, and faces; degenerate faces; mesh holes; t-vertices; non-manifold edges; folded faces; and other printability defects that render the input model 102 unprintable.

In addition to generally identifying various printability defects, the printability analyzer 406 utilizes mesh algorithms to detect locations (e.g., affected vertices and faces) of the identified defects. The printability analyzer 406 can further output a set of vertex attributes, face attributes, and other data that indicates locations of defects in the original mesh.

As shown in FIG. 4, the printability analyzer 406 includes a mesh repairer and slicer 408 to facilitate repair of various printability defects identified by the printability analyzer 406. In one or more embodiments, the mesh repairer and slicer 408 automatically repairs the printability defects (e.g., without receiving user input defining the repairs). Alternatively, in one or more embodiments, the three-dimensional preview generating system 400 provides a preview of the mesh (e.g., a three-dimensional rendering of the printability texture map) and enables a user to interact with the preview to correct one or more of the printability defects. Additionally, in one or more embodiments, the mesh repairer and slicer 408 automatically repairs certain types of defect while enabling the user to repair other types of defects.

Additionally, as mentioned above, in one or more embodiments, the printability analyzer 406 identifies printability issues and corrects the printability issues prior to performing any number of analyses on the input model 102. Thus, in one or more embodiments, each of the accuracy analysis, appearance analysis, and the integrity analysis are performed on a modified version of the input model 102 after various printability issues have been corrected.

As further shown in FIG. 4, the three-dimensional preview generating system 400 includes an accuracy analyzer 410. In particular, the accuracy analyzer 410 analyzes the input model 102 (or modified input model 102) to identify accuracy defects of the input model 102 and printable object. For example, the accuracy analyzer 410 identifies differences between the input model 102 and an object printed based on the input model 102. It is appreciated that the accuracy analyzer 410 can perform the accuracy analysis by generating a warp estimation model, slope accuracy test, and/or radial dimension accuracy test similar to one or more embodiments described herein.

As further shown in FIG. 4, the three-dimensional preview generating system 400 includes an appearance analyzer 412. In particular, the appearance analyzer 412 analyzes the input model 102 (or modified input model 102) to identify appearance properties of the input model 102 and printable object. For example, the appearance analyzer 412 identifies properties associated with the physical appearance of a printed object based on the input model 102. It is appreciated that the appearance analyzer 412 can perform the appearance analysis by performing a surface roughness analysis and generating a photorealistic preview similar to one or more embodiments described herein.

As further shown in FIG. 4, the three-dimensional preview generating system 400 includes an integrity analyzer 414. In particular, the integrity analyzer 414 analyzes the input model 102 (or modified input model 102) to identify structural properties of the input model 102 and printable object. For example, the integrity analyzer 414 identifies properties and defects associated with the structure (e.g., structural strength) including portions of the printable object that are prone to break during or after printing the object. It is appreciated that the integrity analyzer 414 can perform the integrity analysis by performing a small part analysis, a shell thickness analysis, and an overhang analysis with support generation similar to one or more embodiments described herein.

As further shown in FIG. 4, the three-dimensional preview generating system 400 includes a true-visual analyzer 416. In particular, the true-visual analyzer 416 analyzes the input model 102 to identify how an object will appear once printed. For example, the true-visual analyzer 416 analyzes the mesh of the input model 102 and modify the mesh to a lower resolution in accordance with printing capabilities of a three-dimensional printer as well as limitations of a material used to print the object. It is appreciated that the true-visual analyzer 416 can perform the true-visual analysis including mesh decimation and other operations similar to one or more embodiments described herein.

In addition, as shown in FIG. 4, the three-dimensional preview generating system 400 further includes a texture generator 418. For example, the texture generator 418 re-maps vertex and face attributes determined by analyzing the input model 102 to u-v coordinates to generate one or more texture maps. Additionally, the texture generator 418 generates texture maps illustrating one or more of ambient textures, diffuse color textures, opacity maps, bump maps, and reflection maps (e.g., environment maps). These textures and geometries are produced with labels about which preview function they serve (e.g., roughness analysis can be indicated using different colors, small parts analysis can be indicated using other indicators)

The texture generator 418 can generate a texture map for the input model 102 as well as one or more texture maps based on various types of analyses of the input model 102. In addition to a texture map for the input model 102, the texture generator 418 can generate a printability texture map 202, an appearance texture map 204, a true-visual texture map 206, an accuracy texture map 208, and an integrity texture map 210. In one or more embodiments, the texture generator 418 generates multiple texture maps for each different type of analysis. As an example, the texture generator 418 can generate multiple integrity texture maps including texture maps corresponding respectively to a small part analysis, a shell thickness analysis, and an overhang analysis with support generation.

Additionally, in one or more embodiments, the texture generator 418 applies one or more texture maps to a mesh of the input model 102 (or modified mesh of the input model 102) to generate three-dimensional renderings of the various texture maps. For example, the texture generator 418 generates a three-dimensional rendering for texture map or type of texture map. In one or more embodiments, the texture generator 418 applies multiple texture maps to a single mesh to generate a three-dimensional rendering of multiple texture maps.

As further shown in FIG. 4, the three-dimensional preview generating system 400 includes an interactive PDF generator 420. In particular, the PDF generator 420 embeds three-dimensional renderings in a PDF document. For example, the PDF generator 420 embeds the three-dimensional renderings in an interactive three-dimensional PDF document. In one or more embodiments, the PDF generator includes the three-dimensional renderings of the texture maps to enable a user to view and interact with previews of the input model 102 without including all data of the input model 102 including data for printing the input model 102 to a three-dimensional object.

As shown in FIG. 4, the three-dimensional preview generating system 400 includes a data storage 422. As further shown in FIG. 4, the data storage 422 includes printer data 424 including information associated with a three-dimensional printer. For example, the printer data 424 includes printer configurations, specifications, user settings, printing resolution, and other information associated with the three-dimensional printer. In one or more embodiments, the three-dimensional preview generating system 400 utilizes the printer data 424 to perform one or more analyses, generate one or more texture maps, and providing a preview that illustrates one or more identified features of an input model 102.

As further shown in FIG. 4, the data storage 422 including model data 426. For example, the model data 426 includes any data associated with an input model 102. For example, the model data 426 includes data about the mesh of the input model 102 as originally designed as well as information associated with modified versions of the input model 102. For instance, in one or more embodiments, the model data 426 includes information associated with corrections to the input model 102 to remove printability defects as well as information associated with lower resolution versions of the input model 102 (e.g., decimated mesh).

Each of the components 402-422 of the three-dimensional preview generating system 400 and corresponding elements may be in communication with one another using any suitable communication technologies. It will be recognized that although components 402-422 and their corresponding elements are shown to be separate in FIG. 4, any of components 402-422 and their corresponding elements may be combined into fewer components, such as into a single facility or module, divided into more components, or configured into different components as may serve a particular embodiment.

The components 402-422 and their corresponding elements can comprise software, hardware, or both. For example, the components 402-422 and their corresponding elements can comprise one or more instructions stored on a computer-readable storage medium and executable by processors of one or more computing devices. When executed by the one or more processors, the computer-executable instructions of the three-dimensional preview generating system 400 can cause a client device and/or a server device to perform the methods described herein. Alternatively, the components 402-422 and their corresponding elements can comprise hardware, such as a special purpose processing device to perform a certain function or group of functions. Additionally, the components 402-422 and their corresponding elements can comprise a combination of computer-executable instructions and hardware.

Furthermore, one or more of the components 402-422 of the three-dimensional preview generation system 400 may, for example, be implemented as one or more stand-alone applications, as one or more modules of an application, as one or more plug-ins, as one or more library functions or functions that may be called by other applications, and/or as a cloud-computing model. Thus, one or more of the components 402-422 of the three-dimensional preview generation system 400 may be implemented as a stand-alone application, such as a desktop or mobile application. Furthermore, one or more of the components 402-422 of the three-dimensional preview generation system 400 may be implemented as one or more web-based applications hosted on a remote server. Alternatively or additionally, one or more components 402-424 of the image rating system 100 may be implemented in a suit of mobile device applications or "apps." To illustrate, one or more of the components of the three-dimensional preview generation system 400 may be implemented in a digital image editing application, including but not limited to ADOBE® PHOTOSHOP® or ADOBE® REVEL®. "ADOBE®," "ADOBE® PHOTOSHOP®," and "ADOBE® REVEL®" are either registered trademarks or trademarks of Adobe Systems Incorporated in the United States and/or other countries.

FIGS. 1-4, the corresponding text, and the example, provide a number of different systems and devices that allows three-dimensional preview generation system 400 to generate a three-dimensional preview that visualizes one or more identified properties of a three-dimensional printable object. In addition to the foregoing, embodiments can also be described in terms of flowcharts comprising acts and steps in a method for accomplishing a particular result. For example, FIGS. 5-6 illustrates flowcharts of exemplary methods in accordance with one or more embodiments.

Figure 5:
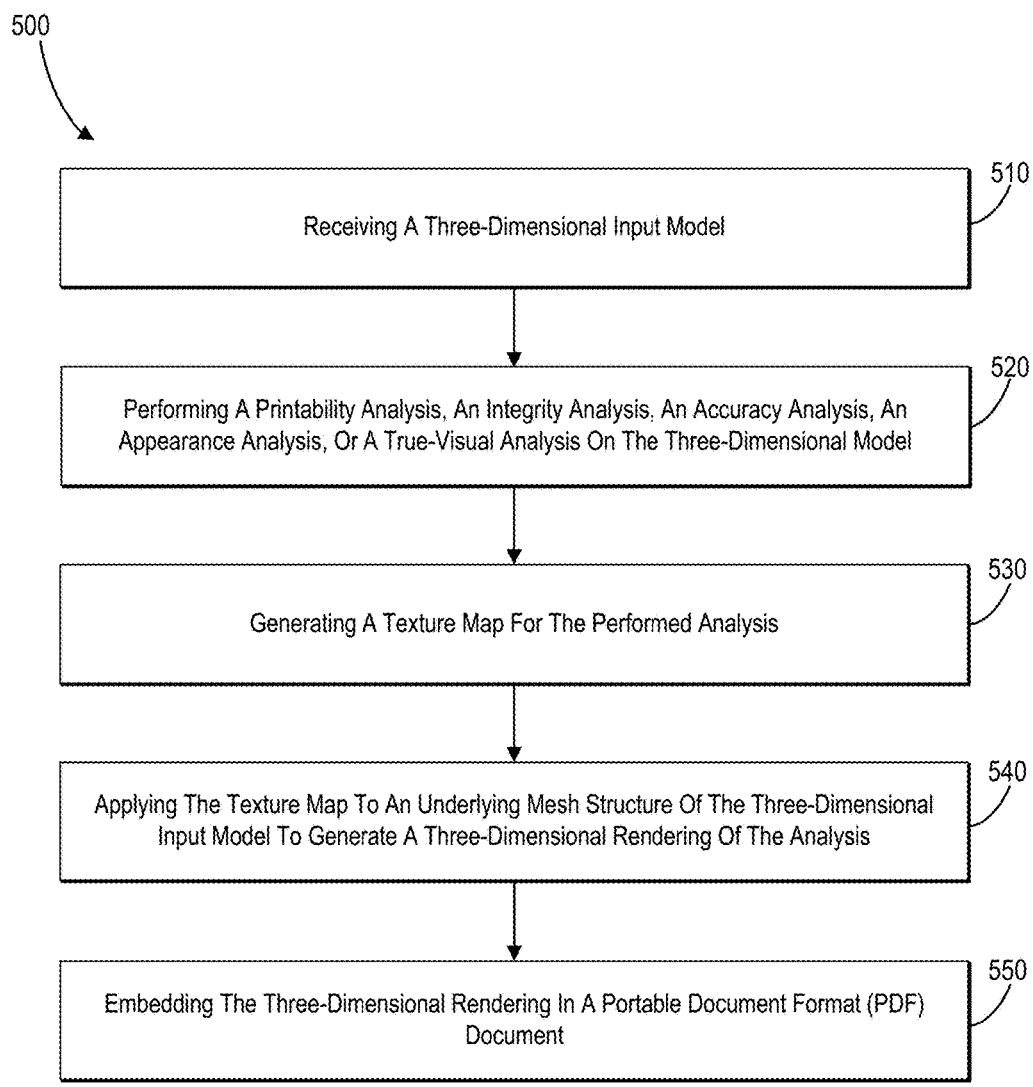
FIG. 5 illustrates a flow chart of a series of acts in a method for generating a portable three-dimensional preview of a three-dimensional model.
Figure 6:
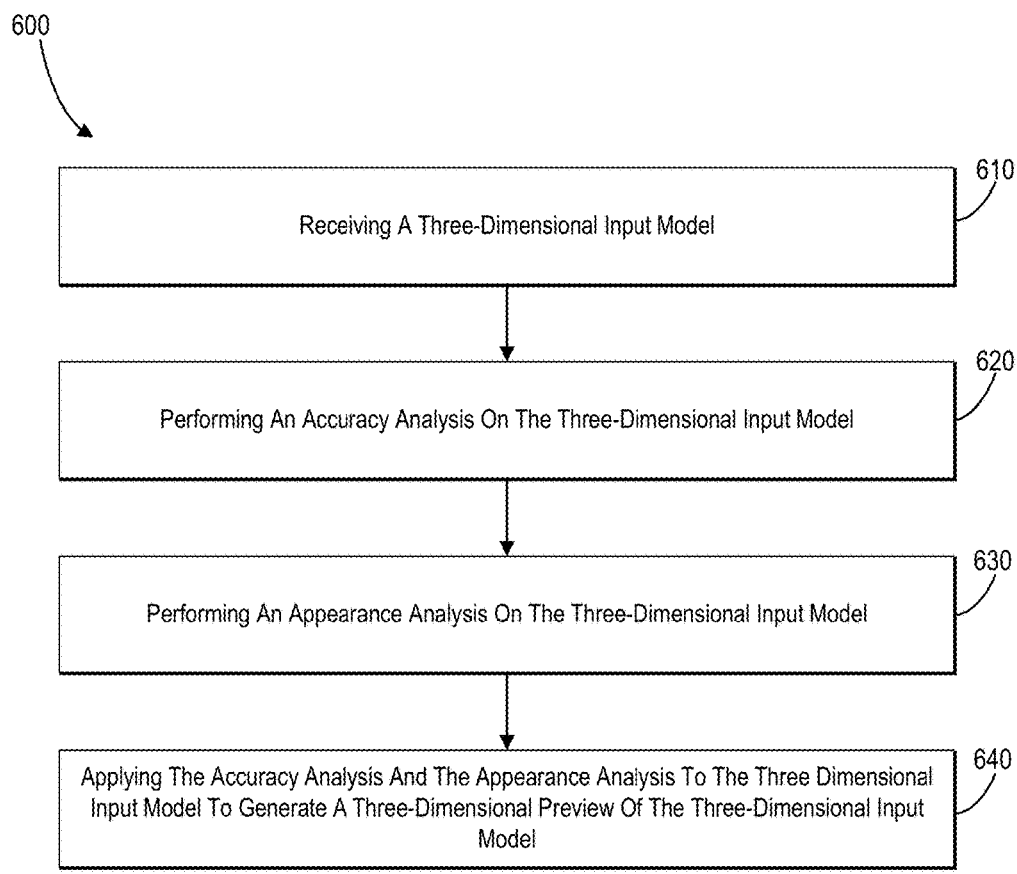
FIG. 6 illustrates a flow chart of a series of acts in a method for generating a portable three-dimensional preview of a three-dimensional model.

FIG. 5 illustrates a flowchart of one example method 500 for generating a three-dimensional preview of an input model 102 to aid in identifying and correcting defects of a resulting object to be printed based on the input model 102. The method 500 includes receiving 510 a three-dimensional input model 102. For example, in one or more embodiments, the act 510 involves receiving a three-dimensional input model 102 that includes an underlying mesh structure. In one or more embodiments, the three-dimensional input model 102 includes a digital model of an object to be printed by a three-dimensional printer.

As shown in FIG. 5, the method 500 includes an act 520 of performing a printability analysis, an integrity analysis, an accuracy analysis, an appearance analysis, or a true-visual analysis on the three-dimensional input model 102. In one or more embodiments, the act 520 involves performing two or more of the printability analysis, the integrity analysis, the accuracy analysis, the appearance analysis, and the true-visual analysis. It is appreciated that performing one or more of the analyses can involve performing each of the printability analysis, the integrity analysis, the accuracy analysis, the appearance analysis, and the true-visual analysis on the three-dimensional input model 102.

In one or more embodiments, performing the printability analysis, the integrity analysis, the accuracy analysis, the appearance analysis, or the true-visual analysis involves identifying properties of an object to be printed based on the three-dimensional input model 102. In one or more embodiments, identifying properties of the object involves identifying one or more defects of the object based on limitations of the three-dimensional printer.

As further shown in FIG. 5, the method 500 includes an act 530 of generating a texture map for the performed analysis. For example, in one or more embodiments, the act 530 involves generating a texture map for the printability analysis, the integrity analysis, the accuracy analysis, the appearance analysis, or the true-visual analysis on the three-dimensional input model 102. It is appreciated that the act 530 can involve generating a plurality of texture maps. For example, in one or more embodiments, the act 530 involves generating a texture map for each of the printability analysis, the integrity analysis, the accuracy analysis, the appearance analysis, or the true-visual analysis performed. In one or more embodiments, the act 530 involves generating multiple texture maps for respective types of analyses. As an example, the act 530 involves generating multiple texture maps for different calculations performed for each of one or more of the above-described analyses.

In one or more embodiments, generating the texture map involves generating a two-dimensional image including a mapping of the underlying mesh structure based on the printability analysis, the integrity analysis, the accuracy analysis, the appearance analysis, or the true-visual analysis. In one or more embodiments, the texture map includes a visualization of one or more properties an object to be printed based on the three-dimensional input model 102. In one or more embodiments, the one or more properties of the object includes properties identified by the printability analysis, the integrity analysis, the integrity analysis, the appearance analysis, or the true-visual analysis.

As further shown in FIG. 5, the method 500 includes an act 540 of applying the texture map to an underlying mesh structure of the three-dimensional input model 102 to generate a three-dimensional rendering of the analysis. For example, in one or more embodiments, the act 540 involves applying the texture map to the underlying mesh structure of the three-dimensional input model 102 to generate a three-dimensional rendering of the printability analysis, the integrity analysis, the accuracy analysis, the appearance analysis, or the true-visual analysis of the three-dimensional input model 102. In one or more embodiments, applying the texture map to the underlying mesh structure involves wrapping the texture map around the underlying mesh structure to generate the three-dimensional rendering of the printability analysis, the integrity analysis, the accuracy analysis, the appearance analysis, or the true-visual analysis. Additionally, where multiple texture maps are generated, the act 540 can involve applying each of the texture maps to the underlying mesh structure of the three-dimensional input model 102 to generate a plurality of three-dimensional renderings of one or more of the printability analysis, the integrity analysis, the accuracy analysis, the appearance analysis, and the true-visual analysis.

As further shown in FIG. 5, the method 500 includes an act 550 of embedding the three-dimensional rendering in a portable document format (PDF) document. For example, in one or more embodiments, the act 550 involves embedding the three-dimensional rendering in an interactive three-dimensional PDF document. Additionally, the act 550 can involve embedding a plurality of three-dimensional renderings in a single PDF document.

In one or more embodiments, the method 500 further involves providing the PDF document via a graphical user interface. Providing the PDF document via the graphical user interface involves providing a plurality of selectable options to view the three-dimensional renderings corresponding to one or more texture maps. For example, in one or more embodiments, each of the plurality of selectable options correspond to respective texture maps of a plurality of texture maps.

In addition, the method 500 may involve detecting a selection of a selectable option from the plurality of selectable options. In response to detecting the selection, the method 500 can involve switching between a view of a first texture map from the plurality of texture maps and a second view of a second texture map from the plurality of texture maps.

FIG. 6 illustrates a flowchart of one example method 600 for generating a three-dimensional preview of an input model 102 to aid in identifying and correcting defects of a resulting object to be printed based on the input model 102. As shown in FIG. 6, the method 600 includes an act 610 of receiving a three-dimensional model 610. For example, in one or more embodiments, the act 610 involves receiving a three-dimensional input model including an underlying mesh structure.

As further shown in FIG. 6, the method 600 includes an act 620 of performing an accuracy analysis on the three-dimensional input model 102. For example, in one or more embodiments, the act 620 involves performing an accuracy analysis on the three-dimensional input model 102 to identify one or more accuracy properties of an object to be printed based on the three-dimensional input model 102.

In one or more embodiments, performing the accuracy analysis involves identifying one or more projected differences between the three-dimensional input model 102 and the object to be printed based on the three-dimensional input model 102. In some instances, identifying one or more projected differences involves calculating one or more properties of the object to be printed based on limitations of a three-dimensional printer. Additionally, in one or more embodiments, identifying one or more accuracies involves measuring a slope and curvature of an outer surface of the three-dimensional input model 102 and comparing measurements of the slope and curvature with the limitations of the three-dimensional printer to identify portions of the object that will be different from the three-dimensional input model 102.

As further shown in FIG. 6, the method 600 includes an act 630 of performing an appearance analysis on the three-dimensional input model 102. For example, in one or more embodiments, the act 630 involves performing an appearance analysis on the three-dimensional input model 102 to identify one or more appearance properties of the object to be printed based on the three-dimensional input model 102. In one or more embodiments, performing the appearance analysis identifying one or more visual characteristics of a surface of the object to be printed based on one or more of a material used to print the object, a resolution of the three-dimensional printer, and u-v coordinates of vertices of the underlying mesh structure of the three-dimensional input model 102.

As further shown in FIG. 6, the method 600 includes an act 640 of applying the accuracy analysis and the appearance analysis to the three-dimensional input model 102 to generate a three-dimensional preview of the three-dimensional input model 102. For example, in one or more embodiments, the act 640 involves applying the accuracy analysis and the appearance analysis to the three-dimensional input model 102 to generate a three-dimensional preview of the three-dimensional input model 102. In one or more embodiments, the three-dimensional preview includes a visualization of the one or more accuracy properties and the one or more appearance properties.

Additionally, in one or more embodiments, the method 600 involves performing additional analyses of the three-dimensional input model 102. For example, in one or more embodiments, the method 600 involves performing an integrity analysis on three-dimensional input model 102 to identify one or more regions of structural vulnerability of the object to be printed based on the three-dimensional input model 102.

Additionally, in one or more embodiments, the method 600 involves performing a printability analysis on the three-dimensional input model 102 to identify one or more printability defects that render the three-dimensional input model 102 unprintable by a three-dimensional printer. In one or more embodiments, the method 600 involves correcting each of the identified one or more printability defects by modifying the underlying mesh structure of the three-dimensional input model 102 to generate a modified three-dimensional input model 102.

In one or more embodiments, the method 600 involves performing the printability analysis on the three-dimensional input model 102 prior to performing the accuracy analysis and the appearance analysis. Further, in one or more embodiments, each of the accuracy analysis and appearance analysis are performed on a modified version of the three-dimensional input model 102 (e.g., a modified version in which one or more printability defects have been corrected). Additionally, in one or more embodiments, applying the accuracy analysis and the appearance analysis to the three-dimensional input model 102 involves applying the accuracy analysis and the appearance analysis to the modified version of the three-dimensional input model 102.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 7:
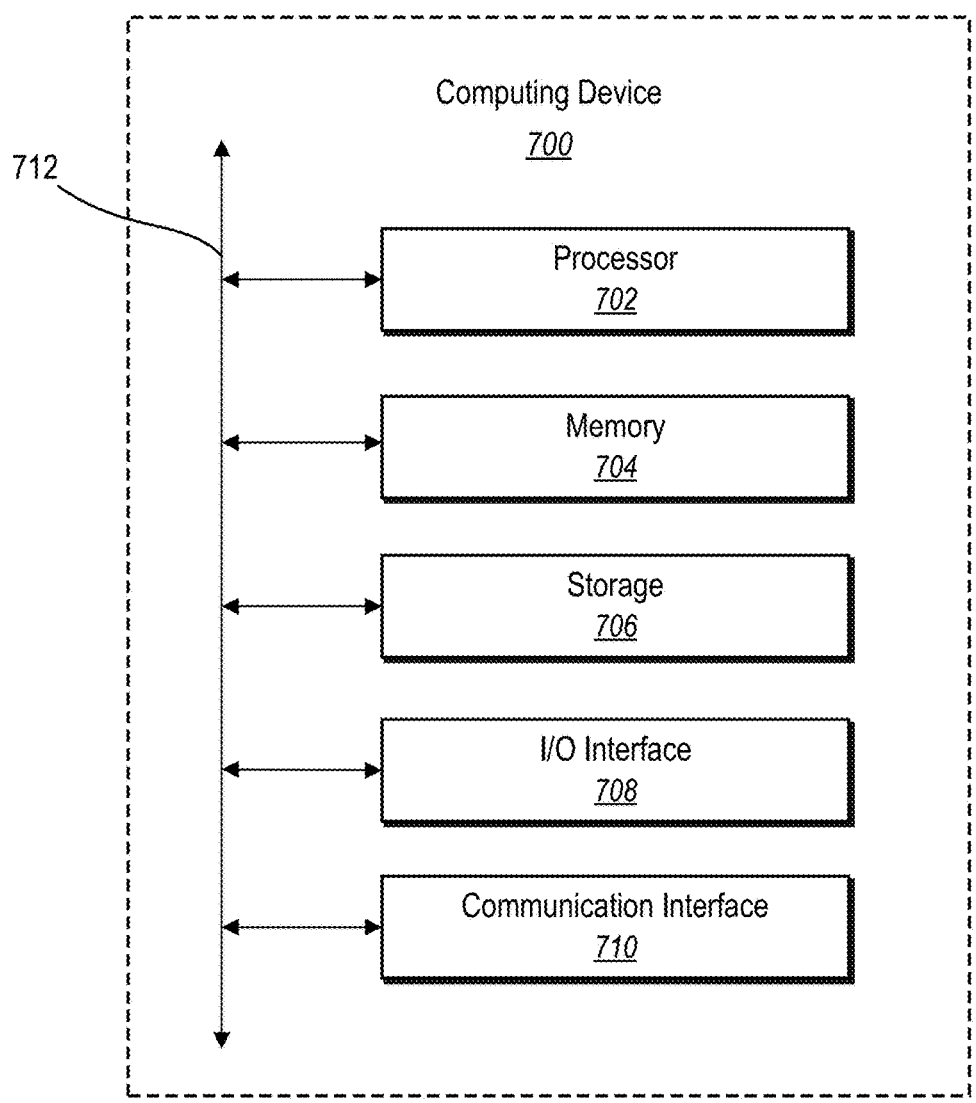
FIG. 7 illustrates a block diagram of an exemplary computing device in accordance with one or more embodiments.

FIG. 7 illustrates a block diagram of exemplary computing device 700 that may be configured to perform one or more of the processes described above. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions for digitizing real-world objects, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions related to object digitizing processes (e.g., digital scans, digital models).

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for designing and printing three-dimensional objects, a method for generating digital images displaying previews of three-dimensional models, the method comprising:
   receiving a three-dimensional input model, the three-dimensional input model comprising an underlying mesh structure;
   performing an accuracy analysis on the three-dimensional input model by identifying projected differences between the three-dimensional input model and a three-dimensional object to be printed based on the three-dimensional input model;
   generating a texture map for the accuracy analysis, the texture map comprising a mapping of the identified projected differences;
   applying the texture map to the underlying mesh structure of the three-dimensional input model to generate a three-dimensional rendering of the accuracy analysis of the three-dimensional input model, the three-dimensional rendering of the accuracy analysis comprising a visualization of the projected differences between the three-dimensional input model and the three-dimensional object to be printed based on the three-dimensional input model; and
   embedding the three-dimensional rendering of the accuracy analysis in a portable document format (PDF) document.

2. The method of claim 1, wherein the three-dimensional input model comprises a digital model of an object to be printed by a three-dimensional printer.

3. The method of claim 1, wherein performing the accuracy analysis comprises identifying properties of the object to be printed based on the three-dimensional input model.

4. The method of claim 3, wherein identifying properties of the object to be printed comprises identifying one or more defects of the object based on limitations of a three-dimensional printer.

5. The method of claim 1, wherein generating the texture map comprises generating a two-dimensional image comprising a mapping of the underlying mesh structure based on the accuracy analysis.

6. The method of claim 5, wherein the texture map comprises a visualization of one or more properties an object to be printed based on the three-dimensional input model, wherein the one or more properties of the object comprise properties identified by an appearance analysis.

7. The method of claim 1, wherein applying the texture map to the underlying mesh structure comprises wrapping the texture map around the underlying mesh structure to generate the three-dimensional rendering of the accuracy analysis.

8. The method of claim 1, further comprising performing an appearance analysis of the three-dimensional input model by identifying one or more projected appearance properties of a surface of the three-dimensional object to be printed based on the three-dimensional input model.

9. The method of claim 8, further comprising:
   generating a second texture map for the appearance analysis, the second texture map comprising a mapping of the identified projected appearance properties of the surface of the three-dimensional object to be printed based on the three-dimensional input model;
   applying the second texture map to the underlying mesh structure of the three-dimensional input model to generate a three-dimensional rendering of the appearance analysis of the three-dimensional input model, the three-dimensional rendering of the appearance analysis comprising a visualization of the identified projected appearance properties of the surface of the three-dimensional object to be printed based on the three-dimensional input model; and
   embedding the three-dimensional rendering of the appearance analysis in the PDF document.

10. The method of claim 9, further comprising providing the PDF document via a graphical user interface, wherein providing the PDF document via the graphical user interface comprises providing a plurality of selectable options to view the three-dimensional rendering of the accuracy analysis and the three-dimensional rendering of the appearance analysis.

11. The method of claim 10, further comprising:
    detecting a selection of a selectable option of the plurality of selectable options; and
    in response to detecting the selection, switching between a view of the three-dimensional rendering of the accuracy analysis and a view of the three-dimensional rendering of the appearance analysis.

12. In a digital medium environment for designing and printing three-dimensional objects, a method for generating digital images previews of three-dimensional models, the method comprising:
    receiving a three-dimensional input model, the three-dimensional input model comprising an underlying mesh structure;
    performing an accuracy analysis on the three-dimensional input model by identifying projected differences between the three-dimensional input model and a three-dimensional object to be printed based on the three-dimensional input model;
    performing an appearance analysis on the three-dimensional input model by identifying one or more projected appearance properties of a surface of the three-dimensional object to be printed based on the three-dimensional input model; and
    applying the accuracy analysis and the appearance analysis to the three-dimensional input model to generate a three-dimensional preview of the three-dimensional input model, the three-dimensional preview comprising a visualization of the projected differences between the three-dimensional input model and the three-dimensional object to be printed and the one or more projected appearance properties of the surface of the three-dimensional object.

13. The method of claim 12, wherein identifying the projected differences between the three-dimensional input model and the three-dimensional object to be printed comprises calculating one or more properties of the three-dimensional object to be printed based on limitations of a three-dimensional printer.

14. The method of claim 13, wherein identifying the projected differences between the three-dimensional input model and the three-dimensional object to be printed comprises:
    measuring a slope and curvature of an outer surface of the three-dimensional input model; and
    comparing measurements of the slope and curvature with the limitations of the three-dimensional printer to identify portions of the three-dimensional object that will be different from the three-dimensional input model.

15. The method of claim 12, wherein performing the appearance analysis comprises identifying one or more visual characteristics of the surface of the three-dimensional object to be printed based on one or more of a material used to print the object, a resolution of a three-dimensional printer, and u-v coordinates of vertices of the underlying mesh structure of the three-dimensional input model.

16. The method of claim 12, further comprising performing a printability analysis on the three-dimensional input model to identify one or more printability defects that render the three-dimensional input model unprintable by a three-dimensional printer.

17. The method of claim 16, further comprising correcting each of the identified one or more printability defects by modifying the underlying mesh structure of the three-dimensional input model to generate a modified three-dimensional input model.

18. The method of claim 17, wherein performing the printability analysis and correcting each of the identified one or more printability defects is performed prior to performing the accuracy analysis and performing the appearance analysis, and wherein:
    performing the accuracy analysis comprises performing the accuracy analysis on the modified three-dimensional input model;
    performing the appearance analysis comprises performing the appearance analysis on the modified three-dimensional input model; and
    applying the accuracy analysis and the appearance analysis comprises applying the accuracy analysis and the appearance analysis to the modified three-dimensional input model.

19. The method of claim 12, further comprising performing an integrity analysis on the three-dimensional input model to identify one or more regions of structural vulnerability of the three-dimensional object to be printed based on the three-dimensional input model.

20. A system for generating digital images displaying previews of three-dimensional models, the system comprising:
    at least one processor; and
        a non-transitory storage medium comprising instructions thereon that, when executed by the at least one processor, cause the system to:
            receive a three-dimensional input model, the three-dimensional input model comprising an underlying mesh structure;
            perform an accuracy analysis on the three-dimensional input model by identifying projected differences between the three-dimensional input model and a three-dimensional object to be printed based on the three-dimensional input model;
            generate a texture map for the accuracy analysis, the texture map comprising a mapping of the identified projected differences;
            apply the texture map to the underlying mesh structure of the three-dimensional input model to generate a three-dimensional rendering of the accuracy analysis of the three-dimensional input model, the three-dimensional rendering comprising a visualization of the projected differences between the three-dimensional input model and the three-dimensional object to be printed based on the three-dimensional input model; and
            embed the three-dimensional rendering in a portable document format (PDF) document.

* * * * *